US011551338B2

(12) United States Patent
Safdarnejad et al.

(10) Patent No.: US 11,551,338 B2
(45) Date of Patent: Jan. 10, 2023

(54) INTELLIGENT MIXING AND REPLACING OF PERSONS IN GROUP PORTRAITS

(71) Applicant: Adobe Inc., San Jose, CA (US)

(72) Inventors: Seyed Morteza Safdarnejad, San Jose, CA (US); Chih-Yao Hsieh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 123 days.

(21) Appl. No.: 17/101,926

(22) Filed: Nov. 23, 2020

(65) Prior Publication Data

US 2021/0073961 A1    Mar. 11, 2021

Related U.S. Application Data

(63) Continuation of application No. 16/189,838, filed on Nov. 13, 2018, now Pat. No. 10,896,493.

(51) Int. Cl.
*G06V 40/16* (2022.01)
*G06T 5/50* (2006.01)

(52) U.S. Cl.
CPC .............. *G06T 5/50* (2013.01); *G06V 40/167* (2022.01); *G06V 40/168* (2022.01); *G06T 2207/20084* (2013.01)

(58) Field of Classification Search
None
See application file for complete search history.

(56) References Cited

U.S. PATENT DOCUMENTS

| 2007/0237421 | A1 | 10/2007 | Luo et al. | |
|---|---|---|---|---|
| 2013/0044958 | A1* | 2/2013 | Brandt | G06V 40/165 382/201 |
| 2013/0094780 | A1* | 4/2013 | Tang | G06T 11/60 382/284 |

(Continued)

FOREIGN PATENT DOCUMENTS

WO    WO 2009/094661 A1    7/2009

OTHER PUBLICATIONS

U.S. Appl. No. 16/189,838, filed Dec. 9, 2020, Notice of Allowance.

(Continued)

*Primary Examiner* — Idowu O Osifade
(74) *Attorney, Agent, or Firm* — Keller Preece PLLC

(57) ABSTRACT

The present disclosure is directed toward intelligently mixing and matching faces and/or people to generate an enhanced image that reduces or minimize artifacts and other defects. For example, the disclosed systems can selectively apply different alignment models to determine a relative alignment between a references image and a target image having an improved instance of the person. Upon aligning the digital images, the disclosed systems can intelligently identify a replacement region based on a boundary that includes the target instance and the reference instance of the person without intersecting other objects or people in the image. Using the size and shape of the replacement region around the target instance and the reference instance, the systems replace the instance of the person in the reference image with the target instance. The alignment of the images and the intelligent selection of the replacement region minimizes inconsistencies and/or artifacts in the final image.

20 Claims, 20 Drawing Sheets

(56) References Cited

U.S. PATENT DOCUMENTS

| | | | | |
|---|---|---|---|---|
| 2014/0043329 | A1* | 2/2014 | Wang | G06V 40/16 |
| | | | | 345/420 |
| 2014/0149376 | A1* | 5/2014 | Kutaragi | G06F 16/5854 |
| | | | | 707/706 |
| 2014/0153832 | A1* | 6/2014 | Kwatra | G06T 11/00 |
| | | | | 382/195 |
| 2016/0179844 | A1 | 6/2016 | Shen et al. | |
| 2016/0239969 | A1* | 8/2016 | Davatzikos | G06K 9/6247 |
| 2018/0158199 | A1 | 6/2018 | Wang et al. | |

OTHER PUBLICATIONS

Vivek Kwatra; Arno Schodl; Irfan Essa; Greg Turk; Aaron Bobick; "Graphcut Textures: Image and Video Synthesis Using Graph Cuts," Published in: Proceeding SIGGRAPH '03 ACM SIGGRAPH 2003 Papers; Journal: ACM Transactions on Graphics (TOG) TOG Homepage vol. 22 Issue 3, Jul. 2003, pp. 277-286.

Richard Szeliski; "Image Alignment and Stitching: A Tutorial," Foundations and Trends in Computer Graphics and Vision, vol. 2, No. 1 (2006).

Richard Hartley and Andrew Zisserman, Multiple View Geometry in Computer Vision, Ch. 8 (2d ed. 2004).

Maurits W Kelder et al: "Snaptric, smart group photo editing", Jul. 30, 2017; 1077952576-1077952576, Jul. 30, 2017 (Jul. 30, 2017), pp. 1-2, XP058370927, DOI: 10.1145/3098900.3098901; ISBN: 978-1-4503-5011-2.

Miriam Redi et al: "The Beauty of Capturing Faces: Rating the Quality of Digital Portraits", arxiv.org, Cornell University Library, 201 Olin Library Cornell University Ithaca, NY 14853, Jan. 28, 2015 (Jan. 28, 2015), XP080675623.

Felzenszwalb P F et al: "Dynamic Programming and Graph Algorithms in Computer Vision", IEEE Transactions on Pattern Analysis and Machine Intelligence, IEEE Computer Society, USA, vol. 33, No. 4, Apr. 1, 2011 (Apr. 1, 2011), pp. 721-740, XP011373531, ISSN: 0162-8828, DOI: 10.1109/TPAMI.2010.135

Xin Lu et al: "RAPID",Multimedia, ACM, 2 Penn Plaza, Suite 701 New York NY 10121-0701 USA, Nov. 3, 2014 (Nov. 3, 2014), pp. 457-466, XP058058692,D01: 10.1145/2647868.2654927ISBN: 978-1-4503-3063-3

Qingxuan Yang et al: "Inertial sensors aided image alignment and stitching for panorama on mobile phones", Proceedings of the 1st international workshop on Mobile location-based service, MLBS '11, Jan. 1, 2011 (Jan. 1, 2011), p. 21, XP055134004,New York, New York, USA DOI: 10.1145/2025876.2025882ISBN: 978-1-45-030928-8

Combined Search and Examination Report as received in UK application GB1912173 0 dated Jun. 23, 2020.

U.S. Appl. No. 16/189,838, filed Jun. 23, 2020, Office Action.

U.S. Appl. No. 16/189,838, filed Oct. 1, 2020, Notice of Allowance.

Intention to Grant as received in UK application GB1912173.0 dated Aug. 23, 2021.

* cited by examiner

INTELLIGENT MIXING AND REPLACING OF PERSONS IN GROUP PORTRAITS

CROSS-REFERENCE TO RELATED APPLICATIONS

The present application is a continuation of U.S. application Ser. No. 16/189,838, filed on Nov. 13, 2018. The aforementioned application is hereby incorporated by reference in its entirety.

BACKGROUND

Recent years have seen significant increases in both technologies for, and use of, digital photography. Indeed, the advent of smart phones with integrated, high quality cameras has led to large percentages of people carrying digital cameras with them almost constantly. This has led to massive increases in the number of digital photos being taken. Not only has the number of digital photographs recently increased, so has the ease and speed of sharing digital photographs. For example, smart phones with social networking applications allow users to share digital photographs almost immediately after capture. Users now seek to capture and share the "perfect picture" as quickly as possible.

One recent advance in aiding photographers in capturing high quality photographs is burst mode or continuous shooting. Digital cameras with burst mode capture multiple frames or images per second. Indeed, digital cameras with burst mode can capture tens of images per second. Burst mode photography helps photographers capture a high-quality image in various different types of moments. Using burst mode to capture a group portrait allows a photographer to capture dozens of images and select the desired instance where imperfections are minimalized. For example, group portraits often have multiple imperfections such as people blinking, looking in the wrong direction, or blurred movement. Burst mode allows the photographer to increase the odds of capturing an image with the smallest number of imperfections, i.e., an image with everyone in the group looking forward with their eyes open.

While using burst mode photography for group portraits provides various advantages, burst mode photography also presents a number of drawbacks. In particular, the chance of capturing the perfect photo of each person's face is often low. For example, one person is likely to the best appearance in one photo and another person is likely to have the best appearance in another photo.

Additionally, combing through multiple group photos using conventional burst mode photography systems is often inefficient. Typically, conventional burst mode photography systems require the photographer to review and compare each individual person's face in potentially dozens of images to identify a desired or high-quality group portrait. Reviewing burst mode images can be both tedious and time consuming because of the difficulty in comparing such similar images. Furthermore, the use of handheld devices with relatively small displays exacerbates these problems as faces within the images can appear relatively small. The time and effort associated with selecting a high-quality group portrait can deter users from employing burst mode when they are trying to capture and share an image quickly.

Conventional photo management systems provide the ability to mix and match parts of burst images. However, the mix and match functionality provided by conventional systems is often inflexible. For example, in order to produce an acceptable result, the conventional systems require that burst photos are taken by a camera mounted on a tripod. Thus, photographers are often not afforded the flexibility of mixing and matching parts of images that have been captured using a handheld camera or mobile phone. If photos are not taken using a tripod, existing systems often produce images that include inconsistencies or artifacts.

Additionally, even if a group of photos is taken using a tripod, images that have been mixed and matched using conventional photo management systems often require intensive manual editing and nonetheless often include inconsistencies and/or visual artifacts. For example, replacing a face or a face bounding box with another face or face bounding box often results in discontinuities and artifacts in the final result. For example, if the person has moved between the two shots in the burst of photos, the face bounding box might include different portions of background structures. Thus, the enhanced image produced by conventional photo management systems will often include inconsistencies.

These and other problems exist with regard to capturing and editing group portraits.

SUMMARY

One or more embodiments described below provide benefits and/or solve one or more of the foregoing or other problems in the art with systems, methods, and computer readable media that intelligently mix and match faces and/or people between burst mode or live photos to generate an enhanced image that reduces or minimize artifacts and other defects. For example, a photographer may capture a series of images, including an imperfect reference image. In particular, a person in the reference image may be blinking or looking away. In one or more embodiments, the disclosed systems can selectively apply different alignment models to determine a relative alignment between the references image and a target image having an improved instance of the person. Upon aligning the digital images, the disclosed systems can intelligently identify a replacement region based on a boundary that includes the target instance and the reference instance of the person without intersecting other objects or people in the image. Using the size and shape of the replacement region around the target instance and the reference instance, the systems, methods, and computer readable media replace the instance of the person in the reference image with the target instance. The alignment of the images and the intelligent selection of the replacement region minimizes inconsistencies and/or artifacts in the final image without requiring the use of a tripod or intensive manual editing.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
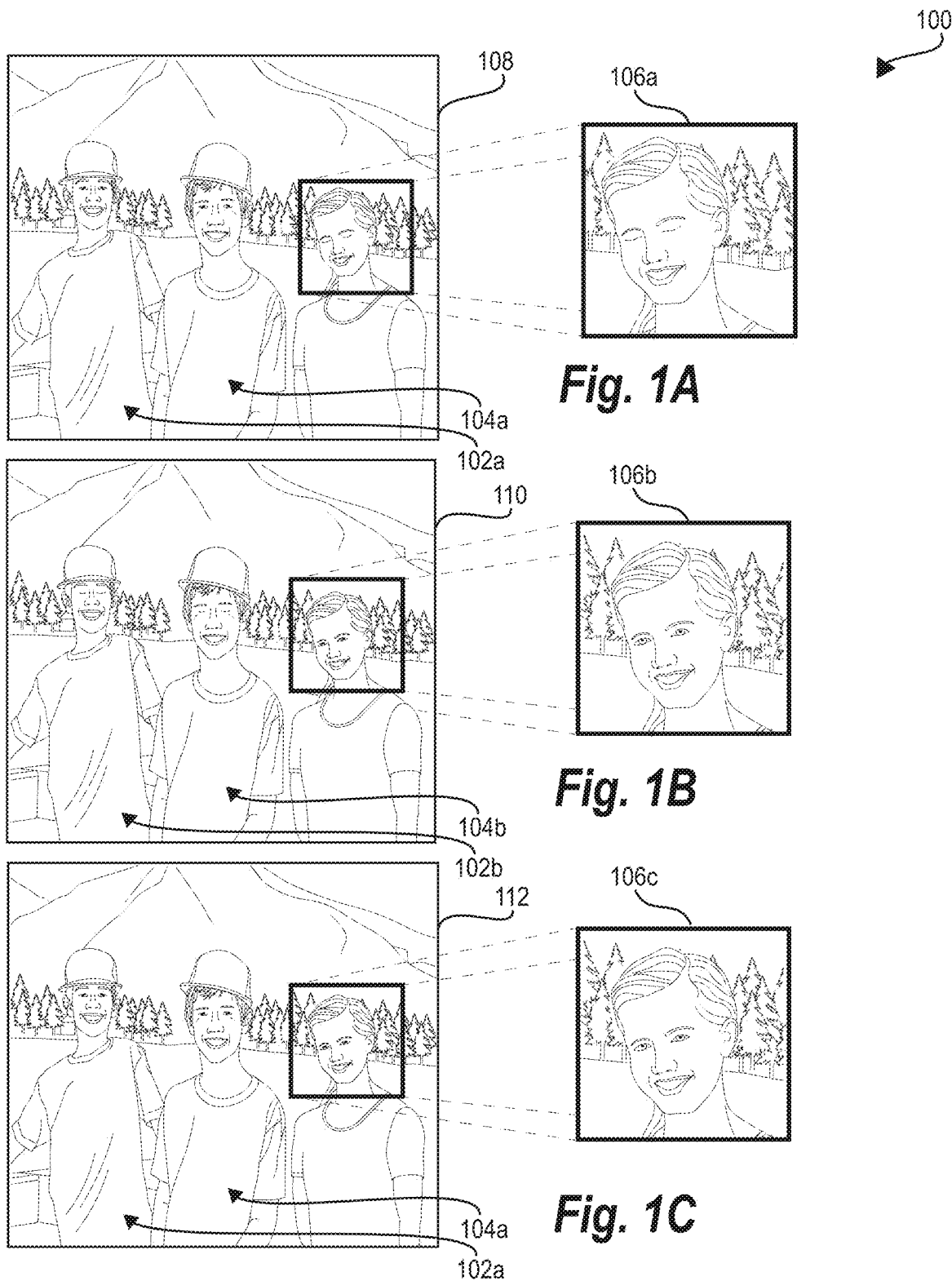
FIGS. 1A-1C illustrate a series of example images including a reference image, a target image, and an enhanced image in accordance with one or more embodiments.

One or more embodiments of the present disclosure include an image region replacement system that can generate a seamless mixed and matched image by intelligently identifying a replacement region around a reference instance of a person and a target instance of a person from a plurality of images. In particular, in one or more embodiments, the image region replacement system aligns multiple images, identifies one or more faces in a reference image that have a better appearance in other images, and replaces an intelligently determined replacement region around each identified face with a similar region from the images with the better appearance of those faces. The selection of the replacement region is purposed to minimize the artifacts in the final image by ensuring that the whole face in the reference image is replaced with the whole face from the target image and by ensuring that the replacement region boundary goes through uniform and less-structured pixels of the images.

More particularly, the image region replacement system aligns a reference image including a reference instance of a person with a target image including a more aesthetically pleasing instance of the person. Once the target image and the reference images are aligned, the image region replacement system intelligently determines a replacement region which includes the reference instance and target instance of the person. For example, the image region replacement system selects a replacement region having a boundary passing through consistent pixels in the target image and the reference image. Thus, the border of the replacement region should avoid structures in the reference image and the target image. In this manner, the image region replacement system allows for artifact free person instance replacement in photos without requiring the use of a tripod or intensive manual editing.

As mentioned, the image region replacement system can efficiently and accurately align a reference image and a target image. For example, in one or more embodiments, the image region replacement system determines a feature-point-deficiency metric and selects an alignment model based on the feature-point deficiency metric. In particular, the image region replacement system can dynamically select an image-alignment model from a pixel-adjusted-gyroscope-alignment model and a feature-based-alignment model based on a feature-point-deficiency metric. The image region replacement system can align images taken using handheld cameras and mobile devices. Thus, the image replacement region can, without the use of a tripod or other method of camera stabilization, align images for region replacement. Once aligned, the image region replacement system can select a replacement region as mentioned above.

As mentioned, the image region replacement system can select a target instance of a person to replace a reference instance of a person as part of generating an enhanced image. In one or more embodiments, a user can manually select a target instance. In alternative embodiments, the image region replacement system can automatically, and without user input, identify a target instance. For example, the image region replacement system can generate a plurality of aesthetic ratings for instances of a person from a plurality of images. The image region replacement system can identify a target instance of the person that has the highest aesthetic rating.

As just mentioned, the image region replacement system can generate a plurality of aesthetic ratings for a plurality of instances of a person. For example, in one or more embodiments, the image region replacement system automatically generates an aesthetic rating for a plurality of instances of a person across a plurality of images based on a weighted sum of different attributes. More particularly, the image region replacement system can extract, from each instance of the person, attributes such as eye openness, face frontal pose, face expression, face sharpness, and others. The image region replacement system can also weight each of these attributes. Based on the extracted attributes and their associated weights, the image region replacement system generates an aesthetic rating for each instance of the person.

In any event, once a target instance is selected and a target image and a reference image are aligned, the image region replacement system intelligently determines a replacement region having a boundary passing through consistent pixels in the target image and the reference image. In particular, the image replacement region determines a plausible boundary region for a replacement region boundary around the target instance of the person and the reference instance of the person, by for example, receiving manual user input or automatically selecting a region surrounding an instance of the person. Thereafter, the image region replacement system uses a graph cut algorithm constrained with finding a boundary within the plausible boundary region with the maximum pixel consistency across the reference and target images. The image region replacement system determines a neighborhood around the reference instance of the person and the target instance of the person and uses union and subtraction operations to identify the boundary for the replacement region. Thus, the border of the replacement region seeks to avoid structures in the reference image and the target image.

In one or more embodiments, the image region replacement system generates an enhanced image by replacing a reference region corresponding to the replacement region with a target region corresponding to the replacement region. In particular, the reference region comprises the border of the replacement region around the reference instance of the person. Likewise, the target region comprises the border of the replacement region around the target instance of the person. The image region replacement system generates a new image where the reference image includes the target instance of the person by replacing the reference region with the target region.

As previously mentioned, the image region replacement system provides numerous advantages and benefits over conventional systems and methods. As an example, the image region replacement system can increase the speed at which users can capture and share a desired group portrait. In particular, the image region replacement system can capture a plurality of images, each image including one or more people, using a burst mode or live image capture technique. The image region replacement system can then score each instance of a person across the plurality of images to identify a target instance of the person with the best appearance. The image region replacement system can replace an instance of the person from a reference image with the target instance of the person with the best appearance. Thus, the image region replacement system can generate an image in which each person has the best appearance without requiring the photographer to attempt to compare and contrast potentially dozens of images.

Furthermore, the image region replacement system can enable users to mix and match images that have been captured using a handheld camera or mobile phone. In particular, the image region replacement system automatically aligns each of the images with respect to a reference image in the set. In particular, the image region replacement system can use pixel-adjusted-gyroscope alignment or feature-based alignment to align the plurality of images. Once the images have been aligned, the image region replacement system can identify faces in the reference image and intelligently replace the identified faces using faces from the plurality of images. Thus, the image region replacement system can afford a user the flexibility to mix and match portions of images captured without the required use of a tripod.

Additionally, the image region replacement system reduces the inconsistencies and visual artifacts usually a part of images produced by conventional photo management systems. In particular, instead of replacing a face or a face bounding box with another face or face bounding box, the image region replacement system intelligently determines a replacement region based on the content of the images. For example, the image region replacement system utilizes a graph cut algorithm tasked with finding a region boundary crossing the most consistent pixels around a reference instance of a person and a target instance of the person. Additionally, the graph cut algorithm can be constrained to avoid structures in the reference image and the target image while also selecting a small boundary around the reference of the person and the target instance of the person. Therefore, the image region replacement system can reduce the number of visual inconsistencies that occur when mixing and matching portions of images.

As illustrated by the foregoing discussion, the present disclosure utilizes a variety of terms to describe features and advantages of the image region replacement system. Additional detail is now provided regarding the meaning of such terms. For instance, as used herein, the term "image" or "frame" refers to any digital item capable of producing a visual representation. For instance, the term "image" includes digital images and frames of digital video. As used herein, the term "digital image" refers to any digital symbol, picture, icon, or illustration. For example, the term "digital image" includes digital files with the following file extensions: JPG, TIFF, BMP, PNG, RAW, or PDF.

As used herein, the term "replacement region" refers to an area around a reference instance of a person and the target instance of the person. In particular, the replacement region is defined by a replacement region boundary that avoids structure (e.g., buildings, items, other people, etc.) in the reference and target images. The image region replacement system uses the area defined by the replacement region to identify a reference region on the reference image and a target region on the target image. The selection of the replacement region is purposed to minimize the artifacts in the enhanced image by making sure that the whole instance of reference person is replaced with the whole instance of the target person without cutting through structures in the images.

As used herein, the term "instance of a person" refers to an occurrence of a person in an image. In particular, in the case where a photographer has taken multiple images (e.g., burst mode, video, or live photo), "instance of a person" refers to one occurrence of a person from one image of the multiple images. The other images from of the multiple burst mode images can also contain instances of the same person. An instance of a person can comprise the person's face alone or the person's face and body as captured within a digital image.

As used herein, "burst mode images" refer to images captured using a burst mode setting. In other words, the term burst mode image refers to one of a group of images captured in rapid succession (e.g., at four frames per second or greater). In particular, the burst mode setting of a handheld mobile device or camera can be used to capture a group portrait including two or more people. As used herein, the term "live photo" refers to a short video (e.g., up to 4 or 5 seconds) from which an image (e.g., a frame) can be selected.

As used herein, the term "attributes" refers to characteristics of an object. In particular, the term "attributes" refers to attributes of an instance of a person within a digital image. For example, the image region replacement system can extract attributes such as eye openness, face frontal pose, face expression, face sharpness, etc. from an instance of a person. Face landmark detection may be used to extract attributes from the appearance of eye landmarks, face contour, mouth landmarks, etc. Based on the extracted attributes, the image region replacement system can generate aesthetic ratings for instances of a person across a plurality of images.

As used herein, the term "aesthetic rating" refers to a rating numeric value representative of a quality of appearance. For example, an aesthetic rating can comprise a value between zero and one, or between zero percent and onehundred percent, indicating the quality of appearance of an object or instance of a person in an image. Additionally, the aesthetic rating can comprise a weighted sum of attributes. For example, each of the attributes can be associated with different weights. Some attributes such as face sharpness can be associated with greater weights than attributes such as eye openness.

As used herein, the term "reference image" refers to an image of a plurality of images. In particular, the image region replacement system will identify a reference image from a plurality of images. The image region replacement system uses the reference image as reference as the image region replacement system removes and replaces an instance of a person. In other words, the image region replacement system replaces pixels in the reference image with pixels from a target image. The reference image may be the least blurry image, the image with a maximum of desirable faces, or simply the first photo in a set of photos.

As used herein, the term "target image" refers to an image of a plurality of images. In particular, the image region replacement system will identify a target image from a plurality of images. The target image includes a target instance for the person, which typically is the instance of the person with the highest aesthetic rating. The image region replacement system identifies a replacement region in the target image to move to the reference image.

As used herein, the term "plausible region" or "plausible boundary region" refers to a region around a reference instance of a person and a target instance of the person that includes the replacement region. In particular, the plausible region refers to an allowable region through which the image region replacement system can look for a boundary of the replacement region. In particular, the plausible region comprises a union of neighborhoods (i.e., an expansion of the instance contour) around the reference and target instances minus the other people and objects in the images. The plausible region will be discussed in additional detail below.

The term "machine learning," as used herein, refers to the process of constructing and implementing algorithms that can learn from and make predictions on data. In general, machine learning may operate by building models from example inputs (e.g., training), such as a training font set, to make data-driven predictions or decisions. In some example embodiments, machine learning is used for data mining, and statistical pattern recognition, such as collaborative feature learning, or learning features from a training image set, which can be supervised or unsupervised.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes one or more machine learning algorithms. In particular, the term neural network can include deep convolutional neural networks (i.e., "CNNs"). In addition, a neural network is an algorithm (or set of algorithms) that implements deep learning techniques that utilize a set of algorithms to model high-level abstractions in data.

As used herein, the term "loss function" or "loss model" refers to a function that indicates error loss between feature vectors and/or probability vectors in multi-dimensional vector space. A machine-learning algorithm (e.g., neural network) can repetitively train to minimize and/or maximize classification error loss (e.g., how accurate or inaccurate the classification is to the ground truth). In some embodiments, the image region replacement system employs loss functions at different stages of training. An example of a loss function includes a classification loss model, which uses a SoftMax classifier with cross-entropy loss, as further described below.

As used in this disclosure, the term "feature-based-alignment model" refers to an image-alignment model that aligns an input image with a reference image based on feature points within the input image and the reference image. In some embodiments, a feature-based-alignment model includes an algorithm that identifies and matches feature points between an input image and a reference image to align the input image with the reference image. For instance, in some embodiments, the image region replacement system applies a feature-based-alignment model by executing a Random Sample Consensus ("RANSAC") algorithm, Least Median of Square ("LMedS") regression algorithm, or other suitable robust-model estimation algorithms to generate feature-alignment parameters and align an input image with a reference image based on the feature-alignment parameters. This disclosure further describes a feature-based-alignment model with reference to FIGS. 4-5B below.

The term "feature-alignment parameters" refers to one or more attributes that relate feature points from one digital image to corresponding feature points from another digital image. In some embodiments, for instance, feature-alignment parameters include attributes that, when applied to a first digital image, align the first digital image with a second digital image based on matching feature points between the first and second digital images. Feature-alignment parameters may be homography-transformation parameters or affine-transformation parameters. Accordingly, in some embodiments, the image region replacement system uses feature-alignment parameters expressed as a matrix relating matching feature points.

As further used in this disclosure, the term "pixel-adjusted-gyroscope-alignment model" refers to an image-alignment model that aligns a digital image with another digital image based on gyroscope datasets corresponding to the digital images and pixel-to-pixel comparison between the digital images. In some embodiments, a pixel-adjusted-gyroscope-alignment model comprises an image-alignment algorithm that aligns an input image with a reference image based on pixel-based-alignment parameters and gyroscope-alignment parameters. In some such cases, the image region replacement system uses pixel-based-alignment parameters to adjust or modify gyroscope-alignment parameters. This disclosure further describes a pixel-adjusted-gyroscope-alignment model with reference to FIGS. 4-5B below.

Relatedly, the term "pixel-adjusted-gyroscope-alignment parameters" refers to one or more indicators that relate an input image to a reference image based on gyroscope data and individual-pixel comparison between the input image and the reference image. In some embodiments, for instance, pixel-adjusted-gyroscope-alignment parameters include attributes that, when applied to a first digital image, align a first digital image with a second digital image based on both pixel-based-alignment parameters and gyroscope-alignment parameters. Further, the term "gyroscope-alignment parameters" refers to one or more indicators that relate an input image to a reference image based on gyroscope datasets. For instance, gyroscope-alignment parameters include transformation parameters that relate a gyroscope dataset corresponding to one digital image to a gyroscope dataset corresponding to another digital image. In some embodiments, for instance, gyroscope-alignment parameters include a matrix that, when applied to a first digital image, align the first digital image with a second digital image based on a focal length of a camera and a relative rotation between the input image and the reference image indicated by gyroscope datasets corresponding to the first and second digital images. Both pixel-adjusted-gyroscope-alignment parameters and gyroscope-alignment parameters may be homography-transformation parameters or (in some cases) affine-transformation parameters. Accordingly, in some embodiments, the image region replacement system uses pixel-adjusted-gyroscope-alignment parameters or gyroscope-alignment parameters expressed as a matrix relating an input image and a reference image.

As used in this disclosure, the term "gyroscope dataset" refers to gyroscope readings corresponding to a device utilized to capture a digital image. In some embodiments, a gyroscope dataset refers to a gyroscope reading (e.g., angular momentum around each axis) captured by a gyroscope sensor or inertial measurement unit ("IMU") at the time a camera captures a digital image. The image region replacement system may refer to, store, or use a gyroscope dataset in a particular format. For instance, the image region replacement system may use a gyroscope dataset stored as Euler angles (e.g., proper Euler angles or Tait-Bryan angles) and rotation data (e.g., rotational velocities) or stored as quaternions. In either case, the image region replacement system may present such gyroscope datasets in a gyroscope data matrix, such as a rotation matrix for gyroscope readings.

As discussed above, the image region replacement system intelligently generates an enhanced image by replacing a reference region of a reference image with a target region of a target image. FIGS. 1A-1C illustrate a series of an example reference image, target image, and an enhanced image. FIGS. 1A-1C illustrate an example series of images 100 in which reference instance of a person 106a is replaced by target instance of the person 106b. In particular, FIG. 1A illustrates an example reference image 108, FIG. 1B illustrates an example target image 110, and FIG. 1C illustrates an example enhanced image 112. As illustrated, reference image 108 and target image 110 are two images part of a plurality of images captured using burst mode, live photo, or a video. Although FIGS. 1A and 1B illustrate only two images, the image region replacement system can work with multiple images (e.g., 5, 10, 15, etc.). The image region replacement system generates the enhanced image 112 using the reference image 108 and the target image 110.

FIG. 1A illustrates an example reference image 108 including a reference instance of the person 106a. FIG. 1A also includes a reference instance of a second person 102a and a reference instance of a third person 104a. As illustrated in FIG. 1A, reference instance of the second person 102a and reference instance of the third person 104a have desirable expressions. However, the reference instance of the person 106a is blinking.

The image region replacement system can identify the reference image 108 using a number of methods. In at least one embodiment, the image region replacement system designates the least blurry image as the reference image 108. The image region replacement system can also generate aesthetic scores for each instance of each person across the plurality of images. Based on the generated scores, the image region replacement system can identify an image with the maximum number of desirable faces and designate that image as the reference image 108. In at least one embodiment, the image region replacement system selects the reference image 108 based on user input. In particular, the image region replacement system presents, to a user, the set of images and allows the user to select the reference image 108. Additionally, in at least one embodiment, the image region replacement system can designate an image with an average angle as the reference image 108. For example, the image region replacement system can determine the angle of the plurality of images and identify an image with the average angle. Thus, because the plurality of images will be aligned with respect to the selected reference image, a reference image with an average angle reduces the alignment required for the greatest number of images. In at least one embodiment, the image region replacement system simply uses the first image in the set of burst images as the reference image.

Once a reference image is selected, the image region replacement system identifies a reference instance of a person for replacement. For example, the image region replacement system can receive user input or selection of a reference instance of a person to replace. Alternatively, the image region replacement system can automatically identify a reference instance of a person to replace without user input. For example, the image region replacement system detects and assigns an aesthetic rating to all the instances of the people in the reference image 108. For example, as illustrated in FIG. 1A, the image region replacement system identifies and assigns an aesthetic rating for each the reference instance of the person 106a, the reference instance of the second person 102a, and the reference instance of the third person 104a. As illustrated in FIG. 1A, the image region replacement system assigns a lower aesthetic rating to the instance of the person 106a because the instance of the person 106a has closed eyes. The method by which the image region replacement system assigns an aesthetic rating to each of the instances of the people is described in further detail with respect to FIG. 2.

In at least one embodiment, the image region replacement system identifies instances of the person from the reference image 108 that have low aesthetic ratings. For example, the image region replacement system determines that the reference image of the person 106a has a low rating while the reference image of the second person 102a and the reference instance of the third person 104a are not low. In at least one embodiment, the image region replacement system qualifies an aesthetic score as being low based on an aesthetic score threshold value. When the image region replacement system determines that the aesthetic score of an instance of a person falls below the predefined threshold, the image replacement regions system will identify it as a reference instance that should be replaced. In at least one embodiment, a user can determine the aesthetic score threshold value.

Once a reference instance is selected, the image region replacement system identifies a target instance of the person to replace the reference instance. For example, the image region replacement system can receive user input or selection of a target instance of a person. Alternatively, the image region replacement system can automatically identify a target instance of a person without user input. For example, as illustrated in FIG. 1A, once the image region replacement system identifies an instance of a person as having a low aesthetic score, the image region replacement system identifies a border area surrounding the reference instance of the person 106a. For example, the border area can be created by extending the contours of the reference instance of the person 106a. In additional embodiments, the image region replacement system creates a border area around the reference instance of the person 106a by creating an inclusive geometric shape, such as a rectangle or circle, around the reference instance of the person 106a. In still further embodiments, the image region replacement system receives a user selection of the border area.

The image region replacement system detects instances of the person 106 across the plurality of images using the border area. In particular, the image region replacement system identifies the border area in each of the plurality of images. The image region replacement system uses facial detection technology to detect instances of the person 106 within the border area in each of the plurality of images. Thus, instead of identifying instances of the second other person 102 and the third other person 104, the image region replacement system can specifically identify instances of the person 106 across the plurality of images.

After identifying the instances of the person 106 across the plurality of images, the image region replacement system generates aesthetic ratings for each of the instances of the person 106 across a plurality of images. As illustrated in FIG. 1B, based on the generated aesthetic ratings for the instances of the person 106, the image region replacement system selects target instance of the person 106b of target image 110. FIG. 1B illustrates example target image 110 including target instance of the person 106b. FIG. 1B also includes instances of the second person 102b and the third person 104b. As illustrated in FIG. 1B, the target instance of the person 106b has a desirable expression (e.g., her eyes are open).

The image region replacement system determines a replacement region around the reference instance of the person 106a and the target instance of the person 106b. In particular, image region replacement system identifies a boundary of the replacement region does not intersect objects or people in the image. In at least one embodiment, the image region replacement system employs a graph cut algorithm to identify the replacement region.

FIG. 1C illustrates the example enhanced image 112 in which the image region replacement system has replaced the reference instance of the person 106a with the target instance of the person 106b. As illustrated, the reference instance of the second person 102a, the reference instance of the third person 104a, and the target instance of the person 106b all have desirable expressions. As further illustrated, the image region replacement system has replaced only the reference instance of the person with the target instance of the person 106b. The instances of the other people in the image are the same as they were in the original reference image. Even though the example enhanced image 112 includes a foreign element, the enhanced image 112 does not contain any inconsistencies or image artifacts.

Figure 2:
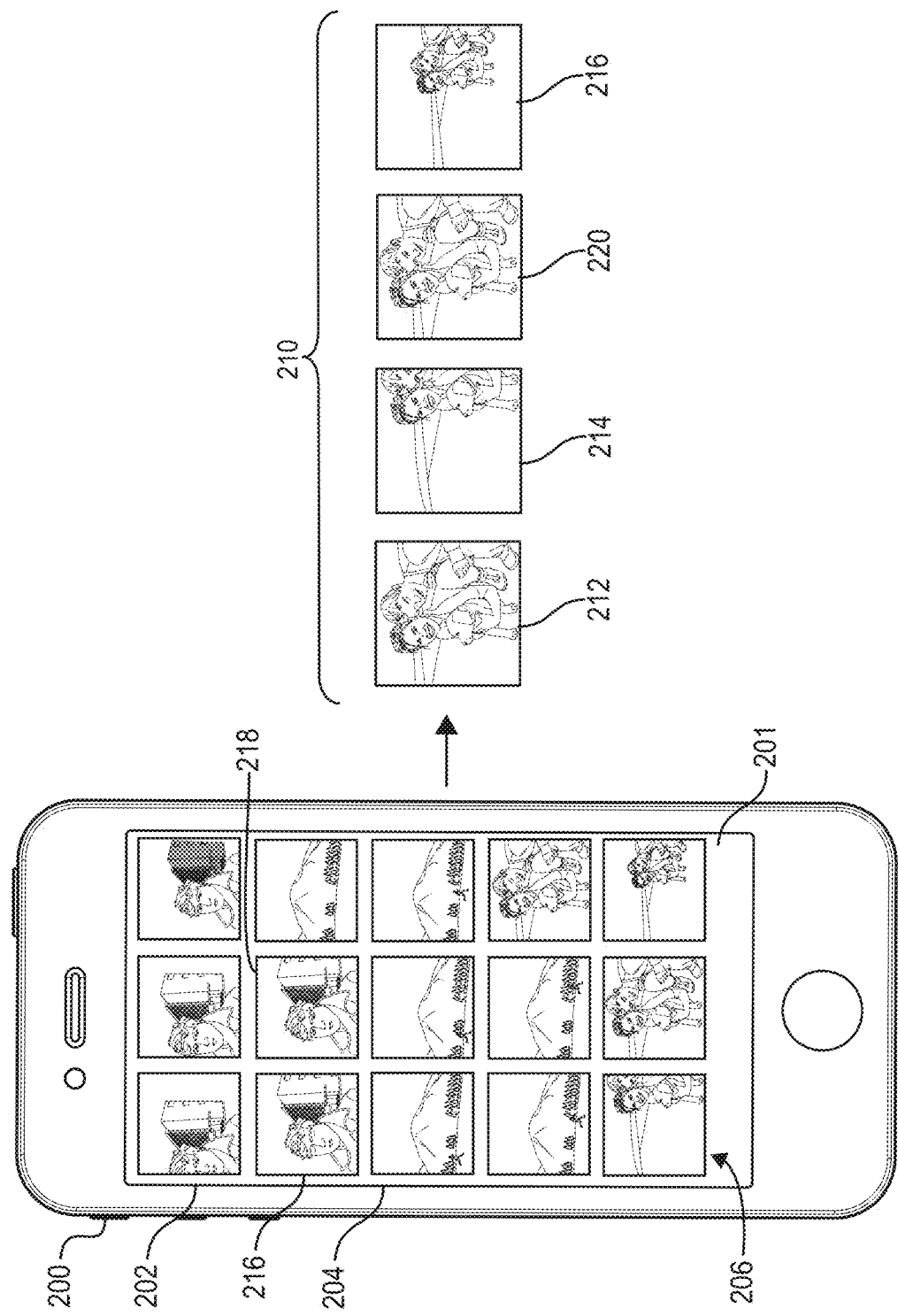
FIG. 2 illustrates a graphical user interface of a handheld device displaying a plurality of images in accordance with one or more embodiments.

Turning now to FIG. 2, FIG. 2 illustrates how the image region replacement system selects a target instance of a person based on generating a plurality of aesthetic ratings for a plurality of instances of the person. In particular, FIG. 2 illustrates a client-computing device 200 with a display 202 showing a plurality of images 206 including a plurality of instances of a person. More specifically, a user interface 204 of the image region replacement system displays the plurality of images 206 (showing three distinct groups of burst mode images).

As shown by FIG. 2, due to the size of the display of the client-computing device 200, each of the images of the plurality of images 206 has a small display size. Due to the small size of the images 206, it can be difficult to compare and contrast the images 206 and more particularly the instances of the person. This is particularly the case when the images 206 are all directed to the same moment or include substantially the same content. For example, it is relatively difficult to determine that the eyes of the person are closed in one image but open in another image. As explained above, the image reference region system can alleviate the time and effort of having to compare small image thumbnails or previews to identify a high-quality instance of a person or image.

FIG. 2 shows a magnification of a plurality of images 210. The image region replacement system detects all instances of a person in the plurality of images 210. As illustrated, the image region replacement system can use face detection technology to identify the faces in the plurality of images 210. For example, the image region replacement system can determine that each of the plurality of images includes an instance of the person. Accordingly, the image region replacement system will identify the instances of each person across the plurality of group portraits.

The image region replacement system can generate an aesthetic rating for each instance of a person in the plurality of images 210. In at least one embodiment the aesthetics ratings comprise a weighted sum of different attributes for each instance of a person. Attributes considered by the image region replacement system include eye openness, face frontal pose, face expression, face sharpness, etc. The image region replacement system may use face landmark detection to extract attributes from the appearance of eye landmarks, face contour, mouth landmarks, and other landmarks.

The plurality of images 210 in FIG. 2 are provided to illustrate some of the attributes the image region replacement system can consider when generating the aesthetic rating for an instance of a person. The image region replacement system can determine that the instance of the person in the image 214 is not completely captured in the canvas of the image. The replacement region selection system can determine that image 220 has a higher quality than image 214 due to image 220 including the full face of the person. The image region replacement system can determine that the instance of the person in image 212 is centered in the canvas of the image, but the person's eyes are closed. The image region replacement system can determine that image 216 is small or blurry due to movement of the camera used to capture the image 216. FIG. 2 illustrates that the image region replacement system has identified the instance of the person in image 220 as the target instance of the person because it has the highest aesthetic rating.

Figure 3A:
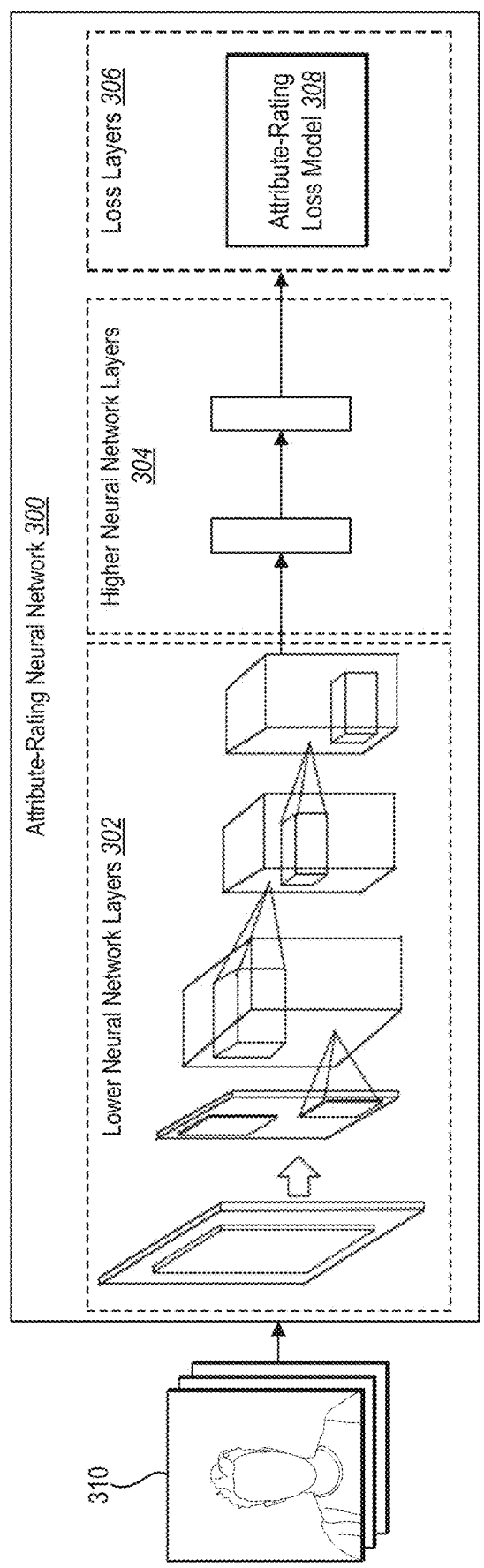
FIGS. 3A-3B illustrates example neural networks for generating an aesthetic score in accordance with one or more embodiments.
Figure 3B:
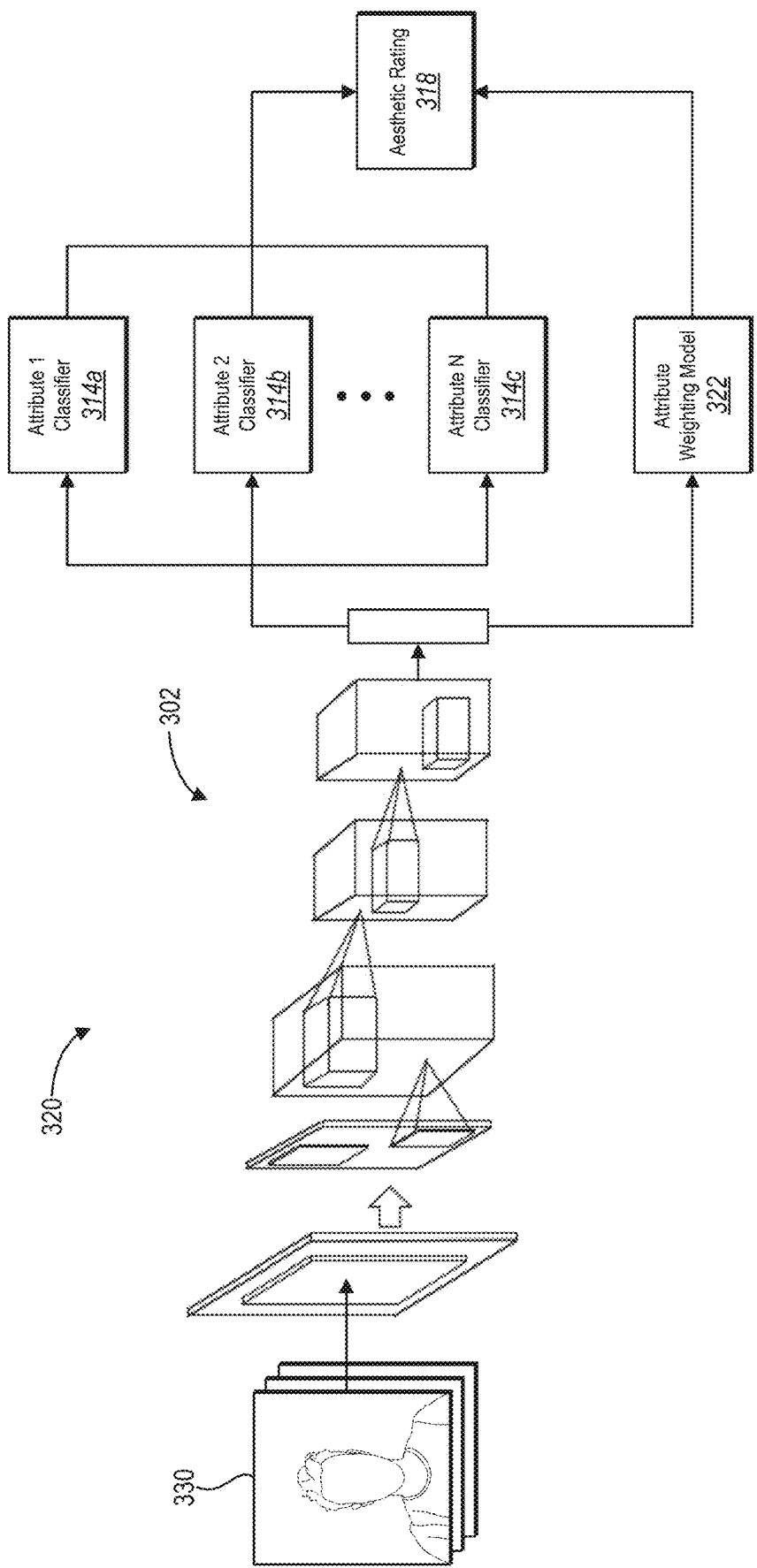

The image region replacement system can generate, train, and use one or more neural networks to perform one or more of the above-described functions. In particular, the image region replacement system can train a neural network to generate aesthetic scores of instances of a person. FIGS. 3A and 3B provide some examples of neural networks that the image region replacement system can use to generate aesthetic scores. One will appreciate in light of the disclosure herein that the image region replacement system can use other neural networks or scoring paradigms.

FIG. 3A illustrates an example of a neural network 300 trained to generate an attribute rating. The attribute rating neural network 300, along with the other neural networks described herein, can be a convolutional neural networks or other types of classification neural networks. The image region replacement system can train and use the attribute rating neural network 300 to generate an aesthetic rating. Alternatively, the image region replacement system can train and use multiple attribute classification neural networks 300 to generate a plurality of attribute ratings. For example, the image region replacement system can train separate attribute rating neural networks 300 to generate ratings for attributes such as open eyes, face pose, face orientation, face expression, face sharpness, noise, darkness, contrast, etc. The image region replacement system can then use the various trained attribute classification neural networks 300 as part of multi-attribute rating neural network as described below in reference to FIG. 3B to generate an aesthetic rating.

As shown by FIG. 3A, the attribute-rating neural network 300 includes lower neural network layers 302, higher neural network layers 304, and loss layers 306. The loss layers 306 include an attribute-rating loss model 308. In one or more embodiments, the lower neural network layers 302 are convolutional layers that encode images (or image patches) into feature vectors. The higher neural network layers 304 can comprise fully-connected layers that classify the feature vectors and output an attribute quality-probability vector. Because of their functions, the lower neural network layers 302 are collectively called an encoder and the higher neural network layers 304 are collectively called a classifier. In some embodiments instead of classifiers, the higher layers can comprise regressors. In some embodiments, the attribute-rating neural network 300 is a deep learning convolutional neural network.

As illustrated, the attribute-rating neural network 300 in this example includes five convolution layers and two fully connected layers. In other embodiments, the image region replacement system can employ networks with more layers. The image region replacement system configures the neural network layers 302, 304 to learn features or image characteristics, such as an amount of darkness, light, contrast, and so forth that together are usable to define higher-level image aesthetics and face aesthetics through use of an attribute rating. For example, in order to learn whether an image is aesthetically "good" features of image characteristics such as lighting, noise, whether the image is "upright", and so on may be learned by the attribute-rating neural network 300 to define an attribute rating.

In particular, the attribute-rating neural network 300 can use training images 310, or patches thereof, to train the attribute-rating neural network 300. In order to efficiently process the training images 310, the attribute-rating neural network 300 can employ patch-based neural network techniques. For example, rather than processing entire images, the attribute-rating neural network 300 can process image patches randomly sampled from the image having a fixed size, e.g., 128, 196, 256, 320 pixel sizes and so forth. Additionally, the attribute-rating neural network 300 can process the patches without down-sampling the image, and thus, may not lose information. In one or more embodiments, the training images can comprise portraits of persons as shown by FIG. 3A.

The lower neural network layers 602 can encode an input image into a feature vector. The features may be expressed in a variety of ways. For example, for each of the patches, a vector having a plurality of dimensions is generated in which each of the dimensions has a corresponding feature. Thus, the vector expresses an amount of each of the respective image features. In one or more embodiments, the features comprise latent features.

The image region replacement system can initially train the attribute-rating neural network 300 using the attribute classification loss model 308. As an overview, the image region replacement system initially trains the attribute-rating neural network 300 by tuning parameters based on training images 310 (or training patches from the training images 310), which are used to generate the feature vectors and the attribute-ratings.

In addition, the image region replacement system employs the attribute-rating loss model 308 to provide feedback based on the accuracy of the attribute-ratings, which enables the image region replacement system to update the tunable parameters. More specifically, the image region replacement system back propagates the error loss to tune parameters in the lower neural network layers 302 and higher neural network layers 304 to classify attribute ratings from the input training images.

To demonstrate, the image region replacement system can provide the training images 310 as input to initially train the attribute-rating neural network 300. For example, in one or more embodiments, the image region replacement system trains the lower neural network layers 302 by tuning feature extractions parameters, which are used to a generate feature vector for each input training images 310. The image region replacement system then provides the generated feature vector to the higher neural network layers 304, which compares the generated feature vector from the lower neural network layers 302 to feature vectors of images with known high-quality attributes based on attribute-rating parameters. Based on the feature vector comparison, the higher neural network layers 304 employ the attribute-rating parameters to generate an attribute-quality probability vector, which indicates a correspondence between the input training image to feature vectors of images with known high-quality attributes.

Next, the image region replacement system provides the attribute-quality probability vector to the attribute-rating loss model 308. The attribute-rating loss model 308 compares the identified attribute rating indicated by the attribute-quality probability vector to the known feature vectors of images with high quality attributes to determine an amount of attribute-rating error loss (or simply "error loss"). Indeed, the image region replacement system can provide the attribute-quality probability vector to the attribute-rating loss model to determine the accuracy and/or error loss of the attribute-rating. In some embodiments, the attribute-rating loss model 308 employs a SoftMax cross-entropy loss attribute-quality classifier and/or mean square error computations to determine the amount of attribute-rating loss. For instance, the attribute-rating loss model 308 identifies when an attribute-quality probability vector is beyond a threshold distance, and/or how far beyond the threshold distance (e.g., error loss) the attribute-quality probability vector from a feature vector for an image of known high quality.

Then, using the error loss to train and optimize the neural network layers of the attribute-rating neural network 300, the image region replacement system can employ back propagation and end-to-end learning to tune feature extraction parameters within layers of the attribute-rating neural network 300. For instance, in one or more embodiments, the image region replacement system takes the error loss output from the attribute-rating loss model 308 and provides it back to the lower neural network layers 302 and/or the higher neural network layers 304 until the error loss from the attribute-rating loss model 308 is minimized. In particular, the attribute-rating loss model 308 provides feedback to the lower neural network layers 302 to further tune the attribute-quality feature extraction parameters and/or the higher neural network layers 304 to further tune the attribute-rating parameters. In this manner, the image region replacement system iteratively trains the attribute-rating neural network 300 to learn a set of best-fit parameters that extract features from an image and accurately classifies a corresponding attribute-quality.

As mentioned above, in some embodiments, the image region replacement system employs the higher neural network layers 304 to determine an attribute-quality probability vector of an input attribute-quality of an input image. As an example of an attribute-quality probability vector, the higher neural network layers 304 outputs a 2-dimensional attribute-quality probability vector with entries ranging between zero and one (i.e., [0-1]). The first entry can be the probability that an input image has a high-quality attribute therein. The second entry in the attribute-quality probability vector can be a probability that the input image has a low-quality attribute therein. The image region replacement system can use the first entry as the attribute rating.

As mentioned above, the image region replacement system can train an attribute-rating neural network 300 to generate an overall aesthetic rating for the attribute of face quality. When generating and training an overall face-quality rating neural network, the image region replacement system can use training images comprising faces with a label as low quality or high quality. In one or more embodiments, low quality faces are faces that have motion blur, are out of focus, have bad illumination or exposure, faces that are occluded (i.e., covered or not entirely in the image), faces with one or more eyes closed, faces with low contrast or that are hazy, faces with heavy image compression, faces with undesired expression, or ugly faces. In one or more embodiments, the image region replacement system warps faces to a fixed size for feature learning and classifier training. To apply a trained face-quality rating neural network, the face-quality rating neural network can employ a face detection algorithm to locate faces in each image. The face-quality rating neural network can then conduct a weighted average on all face quality ratings based on a spatial face map, which encodes a number of faces, sizes of faces, locations of faces, and the face quality ratings.

Alternatively, rather than training an attribute-rating neural network 300 to generate an overall aesthetic rating, the image region replacement system can train a plurality of attribute-rating neural networks 300 to rate a plurality of attributes as mentioned above. In such embodiments, the image region replacement system can then employ a multi-attribute rating neural network 320 as shown in FIG. 3B. As describe below, a multi-attribute rating neural network 320 can provide the advantage of being able to control which attributes are weighted higher when determining an aesthetic rating. In particular, the multi-attribute rating neural network 320 can include attribute weighting model 322 that can allow a user to specify which attributes are more heavily rated (eyes open is more important that smile, etc.).

More specifically, upon training multiple attribute-rating neural networks, the image region replacement system generate a multi-attribute rating neural network 320 as shown in FIG. 3B. In particular, the image region replacement system can generate the multi-attribute rating neural network 320 by combing the higher neural network layers (e.g., attribute classifiers 314a-314c) and an attribute weighting model 322. FIG. 3B shows that the multi-attribute rating neural network 320 shares the lower neural network layers 302 (i.e., the feature encoder). In alternative embodiments, each classifier can have a separate feature encoder.

The multi-attribute rating neural network 320 provides improved ratings of images. For example, upon receiving an input image, the multi-attribute rating neural network 320 provides the image to the feature encoder (i.e., lower neural network layers 302), which generate a feature vector for the image. The multi-attribute rating neural network 320 then provides the feature vector to each of the attribute classifiers 314a-314c and the attribute weighting model 322. The attribute classifiers 314a-314c each output an attribute rating as described above in relation to FIG. 3A for the input image.

In addition, the attribute weighting model 322 outputs a multi-dimensional weighting vector that includes an attribute weight for each attribute having a corresponding attribute classifier 314a-314c. The individual attribute weights indicate how to combine the attribute ratings output from the attribute classifiers 314a-314c to best generate an aesthetic rating for an image. In particular, to generate an aesthetic rating 318, the multi-attribute rating neural network 320 weights the attribute ratings output from the attribute classifiers 314a-314c by a corresponding weight output from the attribute weighting model 322 and then sums the weight-adjusted attribute ratings scores to generate the aesthetic rating 318.

Figure 4:
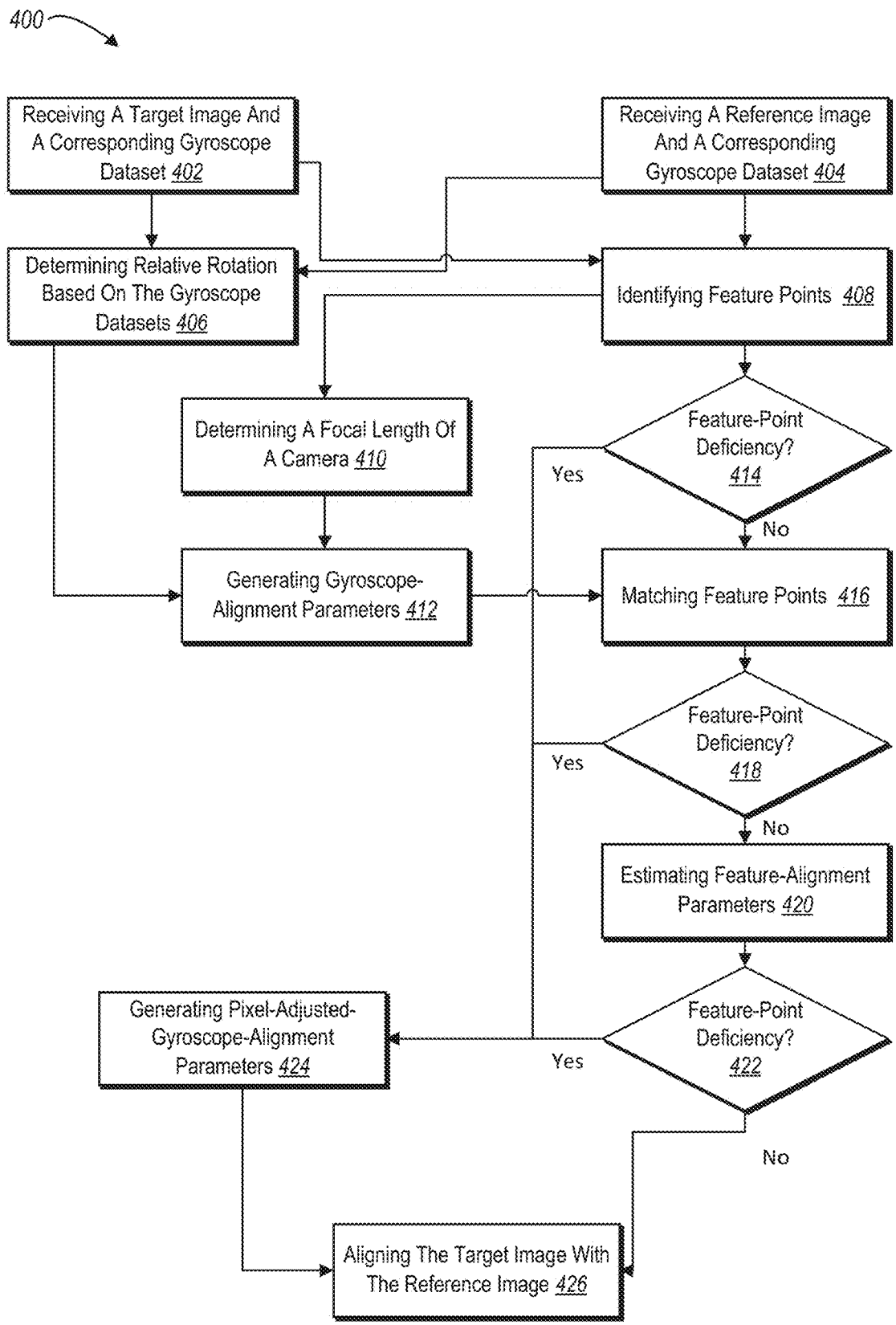
FIG. 4 illustrates a sequence-flow diagram for selecting and applying an image-alignment model from a pixel-adjusted gyroscope-alignment model and a feature-based-alignment model to align a target image with a reference image in accordance with one or more embodiments.

Thus, in order to generate an aesthetic rating for each instance of a person in a plurality of images, the image region replacement system can feed the images to an attribute-rating neural networks 300 trained to rate overall face quality or a multi-attribute rating neural network 320, which return an aesthetic rating. The image region replacement system can then use the generated aesthetic ratings to select one or more of the reference image or the target image. Once the target and reference images for a given instance of person are selected, the image region replacement system can align the target and reference images. In particular, the image region replacement system can select (and apply) an image-alignment model chosen from a feature-based-alignment model or a pixel-adjusted-gyroscope-alignment model. For example, FIG. 4 illustrates the image region replacement system selecting between image-alignment models. In particular, FIG. 4 depicts a sequence-flow diagram 400 of acts 402-426 by which the image region replacement system selects and applies an image-alignment model from a pixel-adjusted-gyroscope-alignment model and a feature-based-alignment model to align a target image with a reference image (e.g., an input image) in accordance with one or more embodiments. As indicated by the sequence-flow diagram 400, upon detecting a feature-point deficiency corresponding to a feature-based-alignment model, the image region replacement system applies a pixel-adjusted-gyroscope-alignment model to align an input image with a reference image. Upon determining an absence of a feature-point deficiency, by contrast, the image region replacement system applies a pixel-based-alignment model to align an input image with a reference image.

As shown in FIG. 4, the image region replacement system performs the act 402 of receiving a target image and a corresponding gyroscope dataset and the act 404 of receiving a reference image and a corresponding gyroscope dataset. When receiving such a target image and reference image, in certain embodiments, the image region replacement system receives a target image and a reference-image captured by a camera of a computing device (e.g., mobile device). In some cases, the computing device records or registers a gyroscope dataset (e.g., an indication of orientation or attitude of a camera based on angular momentum around each axis) at the time a camera captures the target image and an additional gyroscope dataset at the time the camera capture the reference image.

As further shown in FIG. 4, the image region replacement system performs an act 406 of determining relative rotation based on the gyroscope datasets. For instance, in some cases, the image region replacement system determines a relative rotation between the target image and the reference image based on (i) the gyroscope dataset corresponding to the input image and (ii) the gyroscope dataset corresponding to the reference image. In some such embodiments, the image region replacement system can determine a relative rotation from the reference image to the target image by comparing (and determining a difference between) the gyroscope dataset corresponding to the target image and the gyroscope dataset corresponding to the reference image.

In addition to determining relative rotation, the image region replacement system further performs the act 408 of identifying feature points within the target image and the reference image. In some embodiments, for instance, the image region replacement system utilizes a SIFT, SURF or ORB algorithm to detect a set of feature points within the target image and a set of feature points within the reference image. Upon detection, the image region replacement system can extract the respective sets of feature points within the target image and the reference image.

As indicated by the remaining acts 410-426, the image region replacement system uses the identified feature points and corresponding gyroscope datasets to either generate and apply pixel-adjusted-gyroscope-alignment parameters or to generate and apply feature-alignment parameters. As shown in FIG. 4, the image region replacement system performs the acts 414, 418, and 422 to determine (at various decision points) whether feature points or feature-alignment parameters corresponding to the target image and reference image demonstrate a feature-point deficiency. If the feature points or feature-alignment parameters indicate a feature-point deficiency, the image region replacement system generates and applies pixel-adjusted-gyroscope-alignment parameters (as part of a pixel-adjusted-gyroscope-alignment model). If the feature points or feature-alignment parameters indicate an absence of a feature-point deficiency, the image region replacement system continues acts that lead toward generating and applying feature-alignment parameters (as part of a feature-based-alignment model).

As shown in FIG. 4, for instance, the image region replacement system performs the act 410 of determining a focal length of a camera. For instance, in some embodiments, the image region replacement system estimates a focal length of a camera that captures the target image and/or the reference image. When determining the focal length of a camera that captures a set of images, the image region replacement system can update an estimate of the focal length based on additional images captured by the camera. Alternatively, in certain implementations, the image region replacement system queries the computing device that captures the target image for a focal length.

In addition to determining a focal length, the image region replacement system further performs the act 412 of generating gyroscope-alignment parameters. As indicated by FIG. 4, in some embodiments, the image region replacement system generates gyroscope-alignment parameters based on gyroscope datasets respectively corresponding to the target image and the reference image and a focal length of a camera. In some such embodiments, the image region replacement system generates gyroscope-alignment parameters based on the relative rotation between the target image and the reference image determined by act 406.

As further shown in FIG. 4, the image region replacement system performs the act 414 of determining whether feature points within one or both of the target image and the reference image include a feature-point deficiency. For instance, in certain embodiments, the image region replacement system determines whether a set of feature points within the target image and/or a set of feature points within the reference image satisfy a threshold amount of feature points. As indicated in FIG. 4, if the feature points within one or both of the target image and the reference image do not satisfy the threshold amount of feature points—and indicate a feature-point deficiency at the decision point—the image region replacement system forgoes applying a feature-based-alignment model and generates pixel-adjusted-gyroscope-alignment parameters in the act 424. If, however, the feature points within both of the target image and the reference image satisfy the threshold amount of feature points—and indicate an absence of a feature-point deficiency at the decision point—the image region replacement system continues with acts for the feature-based-alignment model.

As indicated by FIG. 4, upon determining an absence of a feature-point deficiency in act 414, the image region replacement system performs the act 416 of matching feature points between the target image and the reference image. For example, in certain implementations, the image region replacement system matches feature points from a feature-point set within the target image to features points from a feature-point set within the reference image. In some such embodiments, the image region replacement system matches feature points between the target image and the reference image according to a Brute-Force Matcher algorithm, a Fast Library for Approximate Nearest Neighbors ("FLANN") algorithm, or any other suitable feature-point-matching algorithm.

After matching feature points, in some cases, the image region replacement system further removes (or filters out) a subset of the matching feature points that conflict with the gyroscope-alignment parameters from act 406. By removing such conflicting matched feature points, the image region replacement system creates a filtered set of matching feature points between the target image and the reference image.

As further shown in FIG. 4, the sequence-flow diagram 400 includes another decision point, that is the act 418. In some embodiments, the image region replacement system performs the act 418 of determining whether matching feature points between the target image and the reference image include a feature-point deficiency. For instance, in certain implementations, the image region replacement system determines whether matching feature points between the target image and the reference image satisfy a threshold amount of matching feature points. As indicated in FIG. 4, if the matching feature points do not satisfy the threshold amount of feature points—and indicate a feature-point deficiency at the decision point—the image region replacement system forgoes applying a feature-based-alignment model and generates pixel-adjusted-gyroscope-alignment parameters in the act 424. If, however, the matching feature points satisfy the threshold amount of matching feature points— and indicate an absence of a feature-point deficiency at the decision point—the image region replacement system continues with acts for the feature-based-alignment model.

Upon determining an absence of a feature-point deficiency in act 418, the image region replacement system performs the act 420 of estimating feature-alignment parameters. For example, in some embodiments, the image region replacement system uses the matching feature points between the target image and the reference image to estimate feature-alignment parameters. As indicated above, the image region replacement system can apply a RANSAC algorithm, LMedS regression algorithm, or other suitable robust algorithms for parametric model estimation to generate the feature-alignment parameters.

As further shown in FIG. 4, the sequence-flow diagram 400 includes a final decision point, that is the act 422. In some embodiments, the image region replacement system performs the act 422 of determining whether feature-alignment parameters include a feature-point deficiency. For instance, in certain implementations, the image region replacement system determines whether the feature-alignment parameters would reasonably align the target image with the reference image based on (or with reference to) gyroscope datasets captured by a computing device or gyroscope-alignment parameters. For instance, the image region replacement system can determine a differential between feature-alignment parameters corresponding to a feature-based-alignment model and a range of expected feature-alignment parameters for an input image determined from a relative rotation (e.g., a range comprising maximum and minimum expected feature-alignment parameters for an input image based on gyroscope datasets or gyroscope-alignment parameters).

Consistent with the decision points above, if the feature-alignment parameters would not reasonably align the target image with the reference image—and indicate a feature-point deficiency—the image region replacement system forgoes applying a feature-based-alignment model and generates pixel-adjusted-gyroscope-alignment parameters in the act 424. If, however, the feature-alignment parameters would reasonably align the target image with the reference image—and indicate an absence of a feature-point deficiency at the decision point—the image region replacement system continues to the act 426 of aligning the target image with the reference image (based on the feature-alignment parameters estimated in the act 420).

As just indicated, if the image region replacement system detects a feature-point deficiency while performing any of the acts 414, 418, or 422, the image region replacement system selects a pixel-adjusted-gyroscope-alignment model instead of a feature-based-alignment model for aligning the target image with the reference image. In particular, upon detecting a feature-point deficiency in the acts 414, 418, or 422, the image region replacement system forgoes applying a feature-based-alignment model and performs the act 424 of generating pixel-adjusted-gyroscope-alignment parameters.

As a precursor to generating pixel-adjusted-gyroscope-alignment parameters, in some embodiments, the image region replacement system warps the target image according to the gyroscope-alignment parameters generated in the act 412 and estimates pixel-based-alignment parameters that would align the warped image with the reference image. Based on both the pixel-based-alignment parameters and the gyroscope-alignment parameters, in some embodiments, the image region replacement system generates the pixel-adjusted-gyroscope-alignment parameters.

As further shown in FIG. 4, the image region replacement system performs the act 426 of aligning the target image with the reference image. As suggested above, if the feature points or feature-alignment parameters indicate a feature-point deficiency, the image region replacement system generates and applies the pixel-adjusted-gyroscope-alignment parameters to the target image to align the input with the reference image. If the feature points and the feature-alignment parameters indicate an absence of a feature-point deficiency, the image region replacement system generates and applies feature-alignment parameters to the target image to align the target with the reference image.

As described above, FIG. 4 demonstrates a flexible and selective image-alignment algorithm. In contrast to some conventional image-alignment systems, the disclosed image region replacement system in FIG. 4 uses a flexible approach that selects between a pixel-adjusted-gyroscope-alignment model and a feature-based-alignment model to align digital images. Alternatively, in some embodiments, the image region replacement system employs a different selective image-alignment algorithm—by using a feature-point-deficiency metric to select between a pixel-based-alignment model and a feature-based-alignment model to align digital images. Accordingly, based on identifying a feature-point deficiency, in some cases, the image region replacement system optionally applies a pixel-based-alignment model (instead of a feature-based-alignment model) to align a target image with a reference image. In such embodiments, the image region replacement system applies the pixel-based-alignment model by comparing pixels across a target image and a reference image and determining pixel-based-alignment parameters for aligning the input image with the reference image based on overlapping pixels between the images.

Figure 5A:
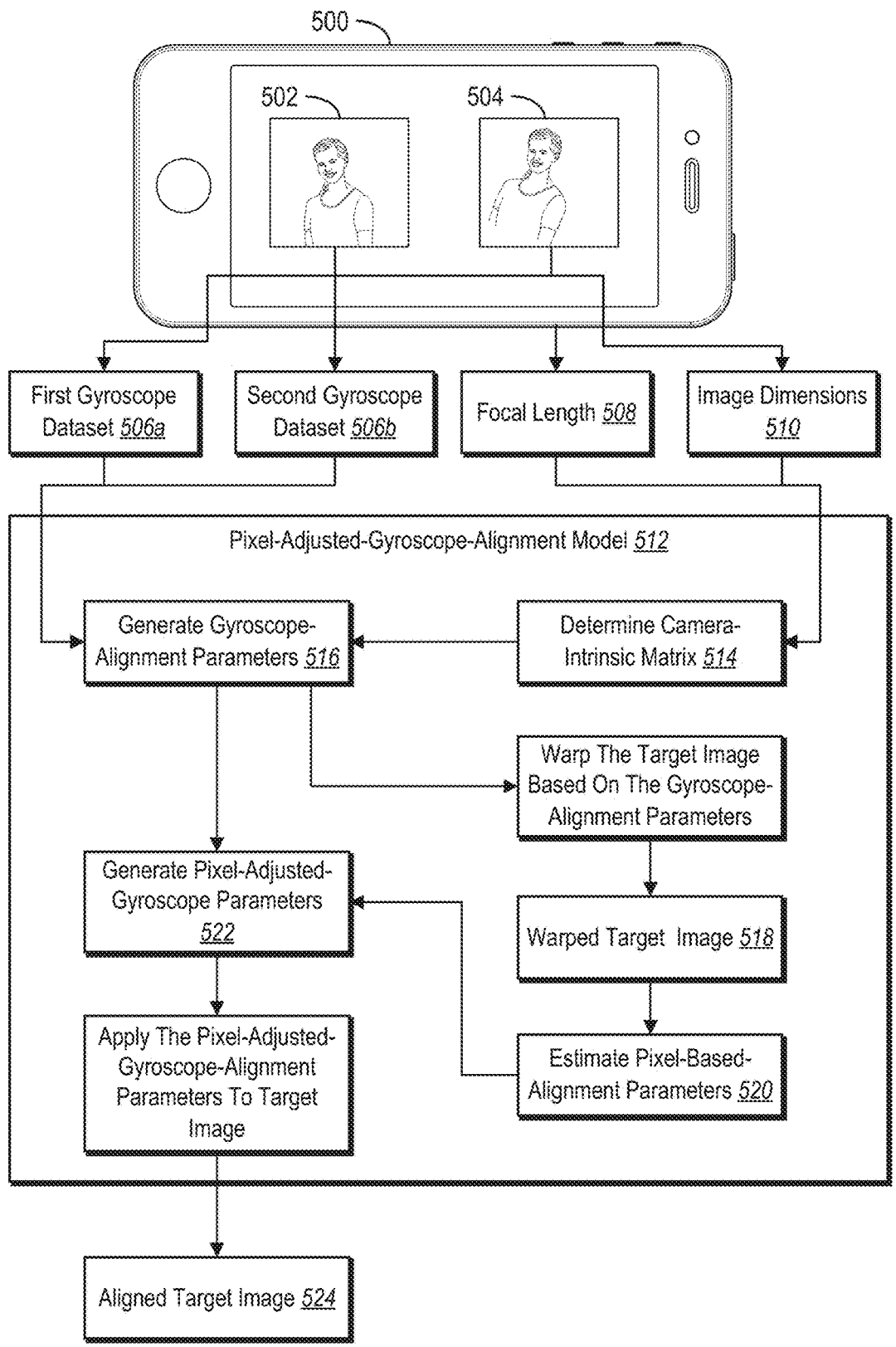
FIG. 5A illustrates an overview of applying a pixel-adjusted-gyroscope-alignment model in accordance with one or more embodiments.

As just noted, in some embodiments, the image region replacement system can apply a pixel-adjusted-gyroscope-alignment model to align digital images. FIG. 5A depicts an embodiment of a pixel-adjusted-gyroscope-alignment model 512. As an overview of FIG. 5A, the image region replacement system identifies a first gyroscope dataset 506a corresponding to a reference image 502 and a second gyroscope dataset 506b corresponding to a target image 504. Based on the first gyroscope dataset 506a and the second gyroscope dataset 506b, the image region replacement system generates gyroscope-alignment parameters 516 for aligning the target image 504 with the reference image 502. The image region replacement system further generates pixel-adjusted-gyroscope-alignment parameters 522 based on the gyroscope-alignment parameters 516 and pixel-based-alignment parameters 520. Having generated the pixel-adjusted-gyroscope-alignment parameters 522, the image region replacement system applies the pixel-adjusted-gyroscope-alignment parameters 522 to the target image 504 to align the target image 504 with the reference image 502.

As shown in FIG. 5A, a camera of a computing device 500 captures the reference image 502 and the target image 504. The computing device 500 subsequently provides (and the image region replacement system receives) the reference image 502 and the target image 504 for analysis. For instance, in some embodiments, the computing device 500 detects a user selection of a selectable option to align digital images (e.g., a selection of an option to align the target image 504 with the reference image 502). Based on detecting the user selection, in some embodiments, the image region replacement system analyzes the reference image 502 and the target image 504 for the pixel-adjusted-gyroscope-alignment model 512.

After image capture, the image region replacement system identifies the first gyroscope dataset 506a corresponding to the reference image 502 and the second gyroscope dataset 506b corresponding to the target image 504. In some embodiments, the computing device 500 uses a gyroscope sensor or an IMU to record (i) gyroscope readings at a time the camera captures the reference image 502 and (ii) gyroscope readings at a time the camera captures the target image 504. Because the first gyroscope dataset 506a and the second gyroscope dataset 506b may differ from each other, the image region replacement system can use this differential to determine a relative rotation between the target image 504 and the reference image 502.

Additionally, in certain embodiments, the computing device 500 stores the gyroscope readings as the first gyroscope dataset 506a and the second gyroscope dataset 506b for the image region replacement system. Consistent with the disclosure above, in some cases, the computing device 500 stores the first gyroscope dataset 506a and the second gyroscope dataset 506b as Euler angles and rotation data or (to avoid gimbal lock sometimes present with Euler angles) as quaternions.

As further shown in FIG. 5A, the image region replacement system determines the focal length 508 for the camera in the computing device 500. In certain implementations, the image region replacement system queries the computing device 500 for the focal length 508. For instance, the image region replacement system can query the computing device 500 for the focal length 508 based on the camera lens's intrinsic calibration when the camera captures the reference image 502 and/or the target image 504.

Alternatively, in certain embodiments, the image region replacement system estimates the focal length 508 based on matching feature points between the reference image 502 and the target image 504. For instance, the image region replacement system can estimate the focal length 508 when (i) matching feature points between the reference image 502 and the target image 504 satisfy a threshold amount of matching feature points and (ii) the camera pans between capturing the reference image 502 and the target image 504. In some embodiments, the image region replacement system estimates the focal length 508 using a calibration method and expresses the focal length 508 in pixels. In some such cases, the image region replacement system estimates the focal length 508 using methods for determining focal length described by Richard Szeliski, "Image Alignment and Stitching: A Tutorial," Foundations and Trends in Computer Graphics and Vision, Vol. 2, No. 1 (2006) (hereinafter "Szeliski"), the entire contents of where are hereby incorporated by reference. Because pixels are sometimes not quadratic, in certain implementations, the image region replacement system determines a first focal length for a horizontal dimension (fx) and a second focal length for a vertical dimension (fy) when determining the focal length 508.

As shown in FIG. 5A, in addition to determining the focal length 508, the image region replacement system identifies image dimensions 510. For example, in some embodiments, the image region replacement system identifies the height and width of the reference image 502 and/or the height and width of target image 504. Additionally, or alternatively, in certain implementations, the image region replacement system identifies a principal point-offset for the camera and/or an axis skew when identifying the image dimensions 510.

Having determined the focal length 508 and the image dimensions 510, the image region replacement system applies the pixel-adjusted-gyroscope-alignment model 512 by using the first gyroscope dataset 506a, the second gyroscope dataset 506b, the focal length 508, and the image dimensions 510. As shown in FIG. 5A, for example, based on the focal length 508 and the image dimensions 510, the image region replacement system determines a camera-intrinsic matrix 514. In some cases, the image region replacement system determines the camera-intrinsic matrix 514 by creating a matrix of intrinsic camera parameters that includes the focal length 508 and a principal axis. Further, in some such embodiments, the image region replacement system determines the camera-intrinsic matrix 514 comprising a focal length, principal point-offset, and an axis skew. In certain cases, the image region replacement system determines the camera-intrinsic matrix 514 by determining an intrinsic calibration matrix described by Szeliski or by determining a calibration matrix described by Richard Hartley and Andrew Zisserman, *Multiple View Geometry in Computer Vision*, Ch. 8 (2d ed. 2004), the entire contents of which are hereby incorporated by reference.

As further shown in FIG. 5A, after determining the camera-intrinsic matrix 514, the image region replacement system generates the gyroscope-alignment parameters 516 based on the first and second gyroscope datasets 506a and 506b and the camera-intrinsic matrix 514. For example, in certain embodiments, the image region replacement system generates the gyroscope-alignment parameters 516 based on a relative rotation between the reference image 502 and the target image 504—as indicated by the first gyroscope dataset 506a and the second gyroscope dataset 506b. In particular, in some such embodiments, the image region replacement system generates the gyroscope-alignment parameters 516 based on the camera-intrinsic matrix 514, the first gyroscope dataset 506a (expressed as a rotation matrix), and the second gyroscope dataset 506b (also expressed as a rotation matrix).

As indicated in FIG. 5A, in some embodiments, the image region replacement system generates the gyroscope-alignment parameters 516 such that the gyroscope-alignment parameters 516, when applied to the target image 504, would approximately align the target image 504 with the reference image 502. Here, the gyroscope-alignment parameters 516 approximately align the target image 504 with the reference image 502 because, in the pixel-adjusted-gyroscope-alignment model 512, the image region replacement system further adjusts the gyroscope-alignment parameters 516 to generate more precise alignment parameters (e.g., by adjusting or combining the gyroscope-alignment parameters 516 with pixel-based-alignment parameters).

After generating the gyroscope-alignment parameters 516, in some embodiments, the image region replacement system warps the target image 504 based on the gyroscope-alignment parameters 516 to generate a warped input image 518. For instance, in certain implementations, the image region replacement system applies the gyroscope-alignment parameters 516 to the target image 504 to perform a homography transformation and to generate the warped input image 518. Accordingly, the warped input image 518 is a warped version of the target image 504.

As further shown in FIG. 5A, after generating the warped input image 518, the image region replacement system estimates pixel-based-alignment parameters 520. In particular, in some embodiments, the image region replacement system estimates translation parameters that would align the warped input image 518 with the reference image 502 based on comparing (e.g., reducing alignment error for) pixels between both images. For example, in certain implementations, the image region replacement system down-samples the reference image 502 and the warped input image 518. In some such implementations, the image region replacement system subsequently applies error metrics (e.g., sum of squared differences or sum of absolute differences, root mean squared intensity pixel error, normalized cross-correlation), hierarchical motion estimation, or Fourier-based alignment to the down-sampled reference image 502 and the down-sampled warped input image 518. Based on such error metrics, hierarchical motion estimation, or Fourier-based alignment, the image region replacement system estimates alignment parameters that would translate pixels from the down-sampled warped input image 518 to the reference image 502.

By employing error metrics, hierarchical motion estimation, or Fourier-based alignment to perform a simple pixel-based translation for down-sampled images (i.e., a pixel-based translation applied to a warped image already roughly aligned based on gyroscope data), the image region replacement system can avoid the processing load consumed by conventional pixel-based-alignment approaches. Even in comparison to hierarchal sampling of pixels employed by some conventional pixel-based-alignment approaches, the image region replacement system expedites estimating the pixel-based-alignment parameters 520 by utilize both gyroscope data and a down-sampled pixel-based translation. In the alternative, in some embodiments, the image region replacement system estimates pixel-based-alignment parameters 520 using hierarchical coarse-to-fine or Fourier transform techniques described by Szeliski.

Indeed, in one or more embodiments, gyroscope data reflects rotational data and panning of a camera utilized to capture the digital image (but not necessarily translation data). By utilizing a fast pixel-based translation estimation on down-sampled input images, the image region replacement system can determine translation information with little computational expenditure. The image region replacement system can then combine the translation transformation (e.g., pixel-based-alignment parameters) with the rotation transformation (e.g., gyroscope-alignment parameters) to form final alignment parameters (e.g., pixel-adjusted-gyroscope-alignment parameters).

As indicated in FIG. 5A, in some embodiments, the image region replacement system estimates the pixel-based-alignment parameters 520 such that the pixel-based-alignment parameters 520, when applied to the target image 504, would approximately align the target image 504 with the reference image 502. Indeed, in relation to FIG. 5A, the image region replacement system uses the pixel-based-alignment parameters 520 to refine or to generate more precise alignment parameters (e.g., by adjusting or combining the gyroscope-alignment parameters 516 with pixel-based-alignment parameters). Moreover, as described above, the image region replacement system can estimate the pixel-based-alignment parameters 520 using less computational processing and avoids the searching of each constituent pixel of an image (as required by some conventional pixel-based approaches).

As further shown in FIG. 5A, after estimating the pixel-based-alignment parameters 520, the image region replacement system generates the pixel-adjusted-gyroscope-alignment parameters 522. In particular, the image region replacement system generates the pixel-adjusted-gyroscope-alignment parameters 522 based on the gyroscope-alignment parameters 516 and the estimated pixel-based-alignment parameters 520. For instance, in some embodiments, the image region replacement system adjusts the gyroscope-alignment parameters 516 based on the estimated pixel-based-alignment parameter 520 to generate the pixel-adjusted-gyroscope-alignment parameters 522. In certain implementations, the image region replacement system combines or multiplies the gyroscope-alignment parameters 516 and the estimated pixel-based-alignment parameters 520 to generate the pixel-adjusted-gyroscope-alignment parameters 522.

As indicated by FIG. 5A, upon generating the pixel-adjusted-gyroscope-alignment parameters 522, the image region replacement system applies the pixel-adjusted-gyroscope-alignment parameters 522 to the target image 504 to generate an aligned input image 524. By applying the pixel-adjusted-gyroscope-alignment parameters 522 to the target image 504, the image region replacement system shifts or warps the target image 504 to align with the reference image 502. For instance, in some embodiments, the image region replacement system warps the target image 504 according to a homography transformation encoded by the pixel-adjusted-gyroscope-alignment parameters 522 to generate the aligned input image 524.

Figure 5B:
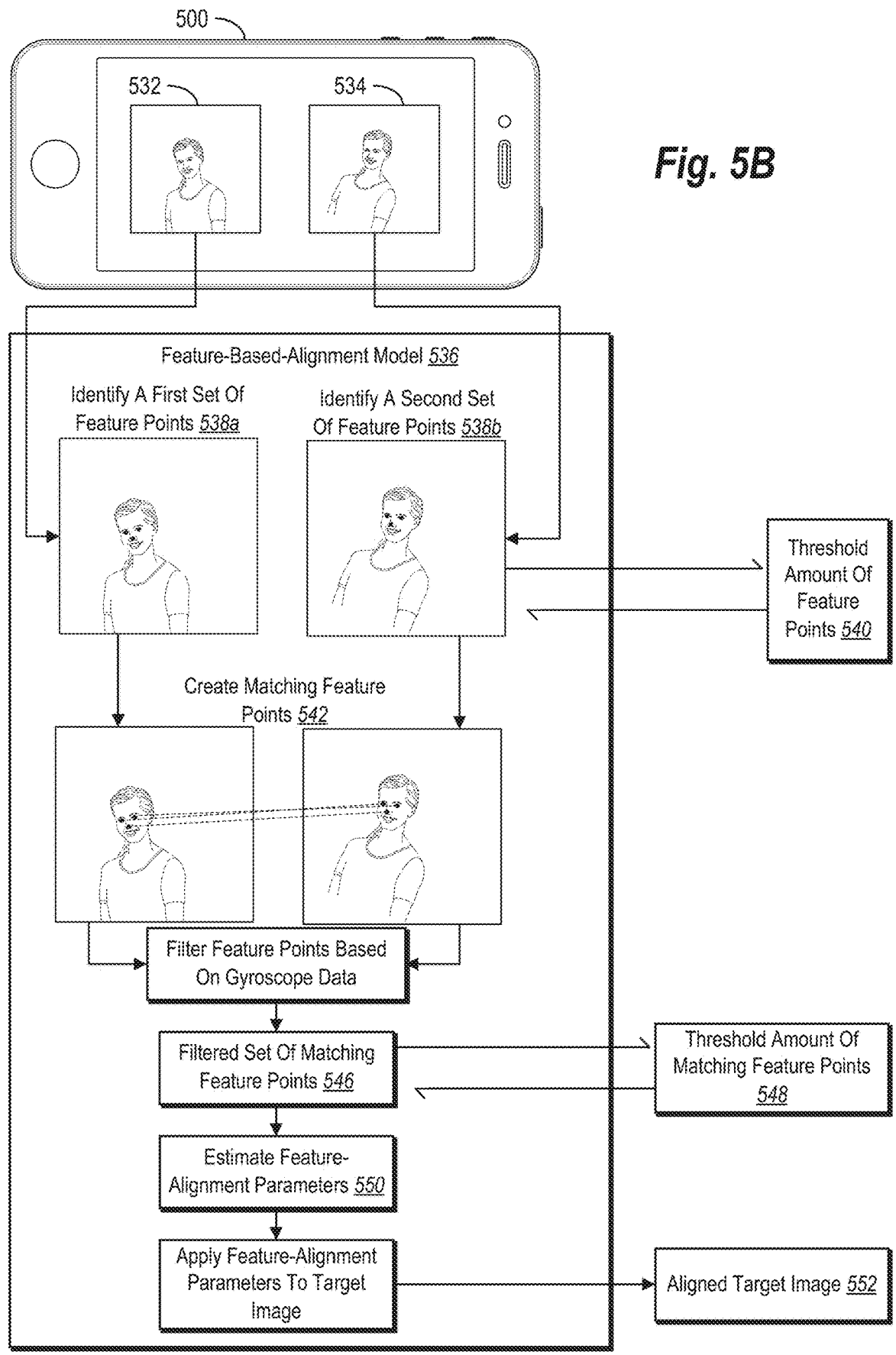
FIG. 5B illustrates an overview of applying a feature-based-alignment-model in accordance with one or more embodiments.

As depicted in FIG. 5A, the image region replacement system can apply the pixel-adjusted-gyroscope-alignment model 512 independent of detecting a feature-point deficiency and independent of a feature-based-alignment model. By contrast, in certain implementations, the pixel-adjusted-gyroscope-alignment model 512 can be part of a selective image-alignment algorithm that selects between the pixel-adjusted-gyroscope-alignment model 512 and a feature-based-alignment model. FIG. 5B illustrates an example of one such feature-based-alignment model.

FIG. 5B depicts the image region replacement system applying a feature-based-alignment model 536 to align a target image 534 with a reference image 532 in accordance with one or more embodiments. As an overview, the image region replacement system identifies a first set of feature points 538a within the reference image 532 and a second set of feature points 538b within the target image 534. The image region replacement system further matches feature points between the reference image 532 and the target image 534 to create matching feature points 542. Based on a filtered set of matching feature points 546, the image region replacement system estimates feature-alignment parameters 550 corresponding to the feature-based-alignment model 536 and applies the feature-alignment parameters 550 to the target image 534. To guide implementation of the feature-based-alignment model 536, in some embodiments, the image region replacement system determines various feature-point-deficiency metrics indicated in FIG. 5B and compares the metrics to deficiency thresholds.

As shown in FIG. 5B, a camera of a computing device 500 captures the reference image 532 and the target image 534. The computing device 500 subsequently provides (and the image region replacement system receives) the reference image 532 and the target image 534 for analysis. For instance, in some embodiments, the computing device 500 detects a user selection of a selectable option to align digital images. Based on detecting the user selection, the image region replacement system analyzes the reference image 532 and the target image 534 for the feature-based-alignment model 536.

After image capture, the image region replacement system identifies the first set of feature points 538a within the reference image 532 and the second set of feature points 538b within the target image 534. In some embodiments, the image region replacement system uses a BRIEF, FAST, ORB, or other suitable detection algorithm as part of identifying the first set of feature points 538a within the reference image 532 and the second set of feature points 538b within the target image 534. Upon detection, in certain implementations, the image region replacement system further extracts the first set of feature points 538a and the second set of feature points 538b and formats each as a feature descriptor or feature vector.

As further shown in FIG. 5B, in addition to identifying the first set of feature points 538a and the second set of feature points 538b, the image region replacement system determines a feature-point-deficiency metric for each of the first set of feature points 538a and the second set of feature points 538b and then compares the feature-point-deficiency metric to a deficiency threshold. As indicated by FIG. 5B, for instance, the image region replacement system determines (i) a first feature-point-deficiency metric by determining a number of feature points in the first set of feature points 538a and (ii) a second feature-point-deficiency metric by determining a number of feature points within the second set of feature points 538b. The image region replacement system further compares each of the numbers of feature points to a threshold amount of feature points 540.

In certain implementations, the threshold amount of feature points 540 can be a predetermined or relative amount of feature points. For instance, in some embodiments, the image region replacement system determines whether each of the first set of feature points 538a and the second set of feature points 538b include a predetermined threshold number of feature points. By contrast, in some embodiments, the image region replacement system determines whether the first set of feature points 538a includes a threshold number of feature points relative to the number of feature points within the second set of feature points 538b. In FIG. 5B, for instance, the image region replacement system determines that each of the first set of feature points 538a and the second set of feature points 538b satisfy the threshold amount of feature points 540.

As further shown in FIG. 5B, the image region replacement system creates matching feature points 542 by matching feature points from among the first set of feature points 538a within the reference image 532 and the second set of feature points 538b within the target image 534. For instance, in some embodiments, the image region replacement system matches feature points between the reference image 532 and the target image 534 according to a Brute-Force Matcher algorithm, a FLANN algorithm, or other suitable feature-point-matching algorithm.

After matching feature points, in certain embodiments, the image region replacement system filters feature points based on gyroscope data to create a filtered set of matching feature points 546. For example, in some cases, the image region replacement system generates gyroscope-alignment parameters that align the reference image 532 with the target image 534 using the methods described above.

The image region replacement system further compares the matching feature points 542 to the gyroscope-alignment parameters and determines whether any of the matching feature points 542 are inconsistent with the gyroscope-alignment parameters. For example, the image region replacement system can apply the gyroscope-alignment parameters and determine that two "matching" feature points are on opposite sides of a scene portrayed in the digital images. Specifically, image replacement system can compare the gyroscope-alignment parameters with an alignment indicated by matching feature points. If the two alignments differ by a threshold amount, the image region replacement system can determine that the matching feature points are erroneous. Thus, the image region replacement system can utilize the gyroscope-alignment parameters to determine that matching feature points are not actually matching.

Upon determining inconsistencies between the matching feature points 542 and the gyroscope-alignment parameters, the image region replacement system then removes any conflicting matching feature points from the matching feature points 542. Upon removing or filtering out the conflicting matching feature points, the image region replacement system identifies the remaining matching feature points as the filtered set of matching feature points 546.

In addition to creating the filtered set of matching feature points 546, in some embodiments, the image region replacement system determines a feature-point-deficiency metric based on the filtered set of matching feature points 546. As indicated by FIG. 5B, the image region replacement system determines a feature-point-deficiency metric by determining a number of matching feature points within the filtered set of matching feature points 546. In some embodiments, the image region replacement system can also determine a feature-point-deficiency metric by determining a number of matching feature points within the matching feature points 542.

As indicated by FIG. 5B, the image region replacement system further compares the number of matching feature points within the filtered set of matching feature points 546 (or, alternatively, the number of matching feature points within the matching feature points 542) to a threshold amount of matching feature points 548. For example, in some embodiments, the image region replacement system determines whether the filtered set of matching feature points 546 include a predetermined threshold number of matching feature points. Additionally, or alternatively, in some embodiments, the image region replacement system determines whether the filtered set of matching feature points 546 include a threshold number of matching feature points given the pixel count or size of the reference image 532 and the target image 534. In FIG. 5B, the image region replacement system determines that the filtered set of matching feature points 546 (or, alternatively, the matching feature points 542) satisfy the threshold amount of matching feature points 548.

As further shown in FIG. 5B, the image region replacement system estimates the feature-alignment parameters 550. As the feature-based-alignment model 536 suggests, the image region replacement system estimates the feature-alignment parameters 550 based on the filtered set of matching feature points 546 or, alternatively, based on the matching feature points 542. As suggested above, the image region replacement system can apply a RANSAC algorithm, LMedS regression algorithm, or other suitable feature-based-image-alignment algorithm to the filtered set of matching feature points 546 (or the matching feature points 542) to generate the feature-alignment parameters 550.

As suggested above, the feature-alignment parameters 550 may take the form of homography-transformation parameters or affine-transformation parameters. In some embodiments, the image region replacement system determines whether the filtered set of matching feature points 546 (or the matching feature points 542) include a threshold amount of features points to create homography-transformation parameters. If the filtered set of matching feature points 546 (or the matching feature points 542) include the threshold amount, the image region replacement system estimates homography-transformation parameters as the feature-alignment parameters 550. If, by contrast, the filtered set of matching feature points 546 (or the matching feature points 542) do not include the threshold amount, the image region replacement system estimates affine-transformation parameters as the feature-alignment parameters 550.

In addition to estimating the feature-alignment parameters 550, in some embodiments, the image region replacement system determines a feature-point-deficiency metric based on the feature-alignment parameters 550. As indicated by FIG. 5B, in certain implementations, the image region replacement system determines a feature-point-deficiency metric by determining a differential between the feature-alignment parameters 550 and a range of expected feature-alignment parameters for the target image 534. In some such embodiments, the image region replacement system determines a differential between the feature-alignment parameters 550 and a range comprising maximum and minimum expected feature-alignment parameters for the target image 534 with respect to the reference image 532—based on the gyroscope datasets or the gyroscope-alignment parameters.

As just indicated, in some cases, the image region replacement system compares the feature-alignment parameters 550 (or a differential for the feature-alignment parameters 550) to gyroscope datasets or gyroscope-alignment parameters corresponding to the reference image 532 and the target image 534. Accordingly, the image region replacement system can determine whether the feature-alignment parameters 550 would reasonably align the target image 534 with the reference image 532 based on a comparison with (or reference to) gyroscope datasets or gyroscope-alignment parameters. For example, in some embodiments, the image region replacement system determines whether a differential for the feature-alignment parameters 550 is equal to, exceeds, or falls below an alignment threshold indicating a percentage or number of values within the feature-alignment parameters 550 that may differ from expected feature-alignment parameters indicated by gyroscope datasets or gyroscope-alignment parameters. As shown in FIG. 5B, the image region replacement system determines that the feature-alignment parameters 550 would reasonably align the target image 534 with the reference image 532 based on a comparison with (or reference to) gyroscope datasets or gyroscope-alignment parameters (e.g., by determining that the feature-alignment parameters 550 or a differential for the feature-alignment parameters 550 satisfy an alignment threshold).

As further indicated by FIG. 5B, upon generating the feature-alignment parameters 550, the image region replacement system applies the feature-alignment parameters 550 to the target image 534 to generate an aligned input image 552. By applying the feature-alignment parameters 550 to the target image 534, the image region replacement system shifts or warps the target image 534 to align with the reference image 532. For instance, in some embodiments, the image region replacement system warps the target image 534 according to a homography transformation (or an affine transformation) encoded by the feature-alignment parameters 550 to generate the aligned input image 552.

While this disclosure primarily refers to a feature-based-alignment model, the feature-based-alignment model 536 in FIG. 5B (and embodiments of a feature-based-alignment model described elsewhere in the disclosure) may likewise be referred to as a "guided feature-based-alignment model." Unlike conventional key-point-based alignment, in some embodiments, the image region replacement system determines one or more feature-point-deficiency metrics and compares such feature-point-deficiency metrics to one or more deficiency thresholds to guide implementation of the feature-based-alignment model 536. Moreover, unlike conventional key-point-based alignment, in certain implementations, the image region replacement system removes conflicting matching feature points to create a filtered set of matching feature points to further guide implementation of the feature-based-alignment model 536.

As noted above, in certain embodiments, the image region replacement system selects between a pixel-adjusted-gyroscope-alignment model and a feature-based-alignment model to align one more target images from a set with a reference image. In more particular notation, the image region replacement system may align a set of target images $I=\{I_i; i\in\{1, \ldots, N\}\}$ with a reference image $I_r$, where $r\in\{1, \ldots, N\}$. By using either the pixel-adjusted-gyroscope-alignment model or the feature-based alignment model to align the set of target images I with the reference image $I_r$, the image region replacement system creates an aligned set of images $A=\{I_i^{(a)}; i\in\{1, \ldots, N\}\}$.

In certain embodiments, the image region replacement system may implement the high-level algorithm shown in Table 1 below to select and apply an image-alignment model from either a pixel-adjusted-gyroscope-alignment model or a feature-based-alignment model to align the set of target images I with the reference image $I_r$. As discussed above, the image region replacement system can read and store gyroscope data corresponding to each input image at the capture time. In the following algorithm, each target image from the set of input images I corresponds to a gyroscope dataset matrix $G_i$, where $G=\{G_i; i\in\{1, \ldots, N\}\}$. Moreover, the image region replacement system extracts a set of feature points $F_i$ from each target image of the set of input target I, where $F=\{F_i; i\in\{1, \ldots, N\}\}$.

TABLE 1

For the reference image $I_r$, extract a set of feature points $F_r$ and a gyroscope dataset $G_r$.
For $i \in \{1, \ldots, r - 1, r + 1, \ldots, N\}$:
    Extract a set of feature points $F_i$ and a gyroscope dataset $G_i$.
    Estimate/update a focal length f.
    Calculate gyroscope-based homography parameters $H_i^G$ via $G_i$ and f:
$$H_i^G = K\ (G_r^{-1} G_i) K^{-1}$$
    in which K represents the camera-intrinsic matrix calculated using the focal length f and image dimensions.
    If a feature-point deficiency is detected in the feature extraction, jump to Failure detection step.
    Match the sets of feature points $F_r$ and $F_i$.
    Filter out the matching feature points that conflict with $H_i^G$.
    If a feature-point deficiency is detected in feature matching and filtering, jump to Failure detection step.
    Estimate feature-based-alignment parameters $H_i$.
    If a feature-point deficiency is detected in the feature-based-alignment parameters $H_i$, jump to Failure detection step.
    Jump to Image Alignment step.
    Failure detection:
        warp input image $I_i$ using $H_i^G$ transformation to create a warped input image $I_i^W$.
        Estimate pixel-based-alignment parameters $H_i^P$ between $I_r$ and the warped input image $I_i^W$.
        Set $H_i = H_i^P\ H_i^G$ to create pixel-adjusted-gyroscope-alignment parameters.

TABLE 1-continued

Image Alignment: warp input image $I_i$ using $H_i$ transformation to align the input image $I_i$ with the reference image $I_r$.

As illustrated by the foregoing algorithm, the image region replacement system starts with feature-based alignment, extracting feature points using a fast algorithm (e.g., ORB key-point detection), and continues with matching the feature points, to form candidate matches utilizing a robust alignment-parameters estimation (e.g., RANSAC or LMedS). In the presence of foreground motion, many of the feature points may correspond to the foreground objects, and thus mislead the background alignment. Accordingly, the image region replacement system uses the information from a gyroscope to predict the camera motion direction and rectify the matching feature points. At each step along the path, if any failure is detected, the image region replacement system falls back to an alignment based on the gyroscope data (and pixel alignment) rather than the feature points. As discussed, failure detection may include, but is not limited to, not detecting enough feature points; not having enough feature-point matches after gyroscope-based rectification; or unreasonable alignment parameters based on the scenario.

For gyroscope (and pixel) based alignment, the image region replacement system roughly aligns an input image with a reference image by calculating the relative rotation between the input image and the reference image using the gyroscope datasets G. This step utilizes the camera focal length. The image region replacement system can estimate the focal length from the matching feature points—if there are enough feature points and there is some camera panning between digital images—or can programmatically query the focal length from a mobile device. Further, because rotation data may only capture camera panning (not the translations), the image region replacement system performs a fast pixel-based translation estimation on down-sampled input images. Then, the image region replacement system combines the translation transformation and the rotation transformations to form the final alignment parameters.

Figure 6B:
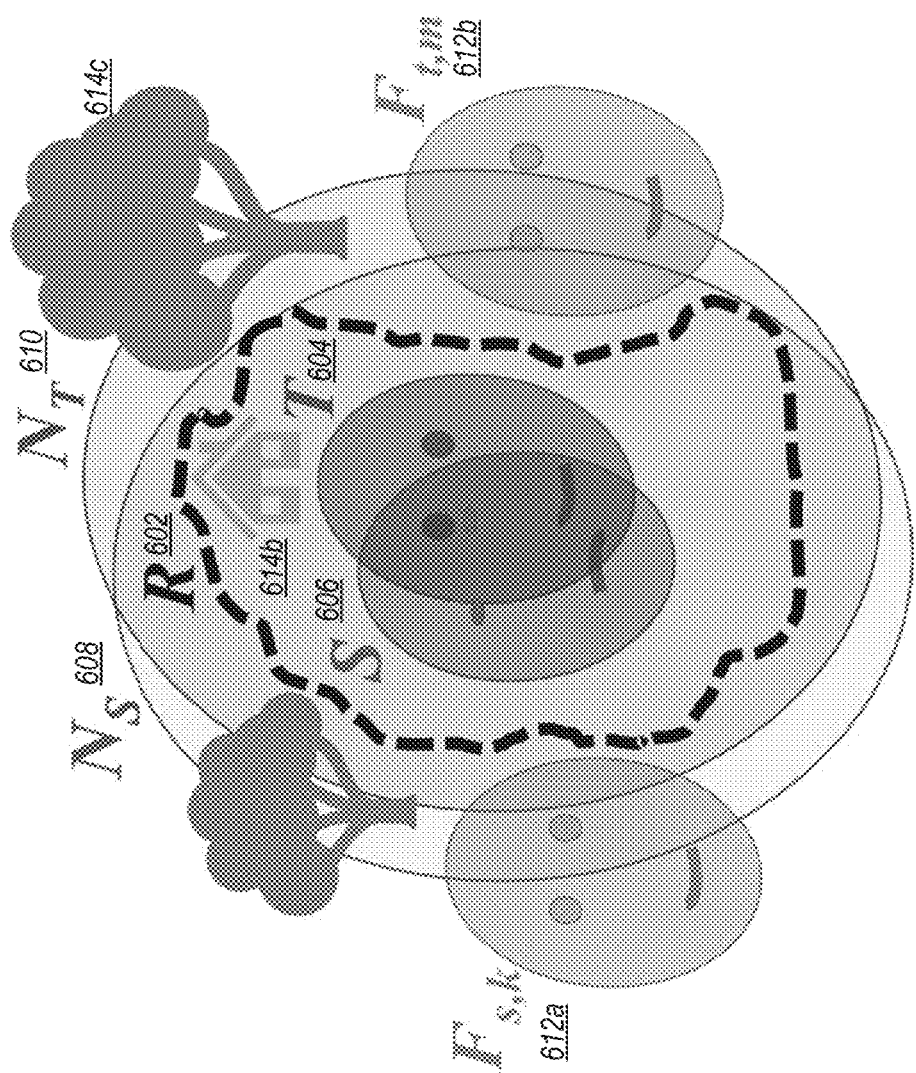
FIGS. 6A-6B illustrate a schematic representation of a process of identifying a replacement region in a reference image and a target image in accordance with one or more embodiments.
Figure 6A:
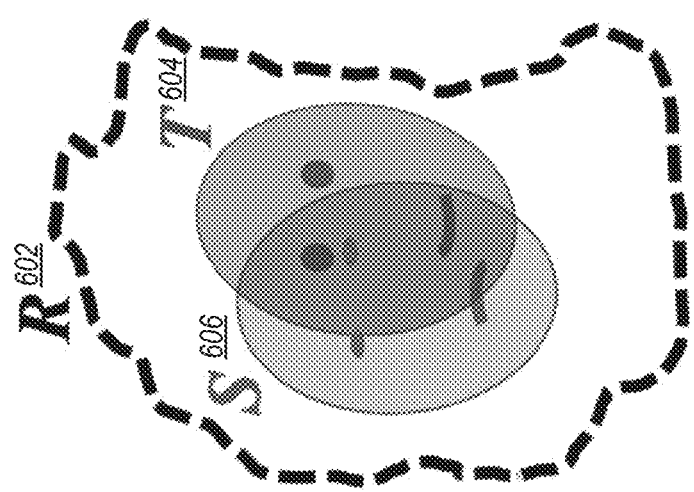

As discussed above, once a target and reference image are aligned, the image region replacement system can determine a replacement region. FIGS. 6A-6B illustrate a schematic representation of a process for identifying a replacement region in a reference image and a target image. In particular, FIG. 6A illustrates an example replacement region boundary 602 around a reference instance of a person 606 and a target instance of the person 604. FIG. 6B illustrates elements of an image that the image region replacement system considers when determining the boundary of the replacement region 602.

FIG. 6A illustrates an example replacement region boundary 602 around the reference instance of the person 606 and the target instance of the person 604. In particular, the target instance of the person 604 comprises a smiling face of the person with opened eyes from a target image. The source instance of the person 606 to be replaced comprises a blinking image of the person from a reference image. Additionally, as illustrated, the replacement region boundary 602 comprises an irregular shape. As will be discussed in further detail below, the image region replacement system generates the replacement region boundary 602 by using a graph cut algorithm constrained to pass through consistent pixels while avoiding structure in the reference image and the target image. Therefore, the irregularity of replacement region boundary 602 allows the image region replacement system to create an enhanced image with the smallest number of artifacts and inconsistencies.

As illustrated in FIG. 6A, the image region replacement system identifies a replacement region boundary 602 that includes the reference instance of the person 606 and the target instance of the person 604, which are offset. Even after the image replacement system has aligned the target image with respect to the reference image, the instances of the person can be offset. This may be the result of the person moving while the burst of images is being captured. Though the target instance of the person 604 and the reference instance of the person 606 as illustrated are offset, in at least one other embodiment, the target instance of the person 604 and the reference instance of the person 606 are evenly, or more, matched.

FIG. 6B illustrates the elements in the image that the image region replacement system considers in order to create the replacement region boundary 602. FIG. 6B includes the replacement region boundary 602, the target instance of the person 604, and the reference instance of the person 606 discussed above with respect to FIG. 6A. Additionally, FIG. 6B includes a reference neighborhood 608 around the reference instance of the person 606 and a target neighborhood 610 around the target instance of the person 604. FIG. 6B also includes other a first other face 612a and a second other face 612b (collectively "other faces 612") and image structures 614a-614c. Although FIG. 6B illustrates two other faces 612 and three image structures 614, the regional replacement system can generate a replacement region boundary 602 around any number of other faces and image structures.

The image region replacement system determines a plausible region around the reference instance of the person and the target instance of the person inside which the graph cut algorithm will generate the replacement region boundary. For the reference instance of the person 606 (S) and the target instance of the person 604 (T), the goal is to find a replacement region boundary (R) such that the replacement region boundary does not cross through the reference instance of the person 606 or the target instance of the person 604. Additionally, the image region replacement system can seek to place the replacement region boundary 602 so it does not cross through S or T and even other faces (denoted $F_{s,k}$ and $F_{t,m}$). As illustrated, FIG. 6B includes the first other face 612a ($F_{s,k}$) and the second other face 612b ($F_{t,m}$). Because the plausible region for the replacement region boundary 602 avoids faces and instances of people, face appearances are not corrupted in any way after pixel replacement. Though FIG. 6B illustrates only two other faces, the image region replacement system can identify any number of other faces and instances of people.

To start defining the plausible region for the replacement region boundary 602, the image region replacement system defines a reference neighborhood 608 ($N_S$) around the reference instance of the person 606 (S) and a target neighborhood 610 ($N_T$) around the target instance of the person 604 (T). In at least one embodiment, the reference neighborhood 608 and the reference neighborhood 610 are a simple expansion of the face contour, or any arbitrary defined neighborhood that covers the corresponding face. Additionally, using methods described in further detail below with respect to FIGS. 8A-8E, a user can define the reference neighborhood 608, the target neighborhood 610, or both.

As illustrated in FIG. 6B, the image region replacement system uses the identified reference neighborhood 608 ($N_S$), target neighborhood 610 ($N_T$), the reference instance of the person 606 (S), the target instance of the person 604 (T), the first other face 612a ($F_{s,k}$), and the second other face 612b ($F_{t,m}$), to define the plausible region. The plausible region P is defined as:

$$P = N_s + N_T - S - T - \sum_k F_{s,k} - \sum_m F_{t,m}$$

Once the image region replacement system determines the plausible region, the image region replacement system uses a graph cut algorithm to look for the replacement region boundary 602 within the plausible region. As used herein, the term "graph cut algorithm" is used to describe an algorithm for determining an optimal replacement region boundary in an image. In particular, the graph cut algorithm is constrained to identify a replacement region boundary that passes through consistent pixels while avoiding structure in the reference and target images.

The image region replacement system uses dynamic programming that chooses the minimum cost path from one of an overlap region to another (e.g., an overlap of the aligned target image and the reference image as shown in FIG. 6B). In order to do so, the image region replacement system places blocks such that they partly overlap with each other by typically 4 to 8 pixels. The image region replacement system determines which patch (e.g. a patch from the reference image or the target image) contributes pixels at different locations in the overlap region. The image region replacement system selects a path between pixels that minimizes a quality cost by choosing a path through pixels where the reference and target patch characteristics (e.g., color) are similar. In particular, s and t can represent two adjacent pixel positions in the overlap region, A(s) and B(s) represent pixel colors at the position s in the old and new patches respectively. The image region replacement system defines the quality cost M between two adjacent pixels s and t that copy from patches A and B respectively to be:

$$M(s,t,A,B) = \|A(s) - B(s)\| + \|A(t) - B(t)\|$$

where $\|\cdot\|$ denotes an appropriate norm. The image region replacement system calculates the quality cost M between all adjacent pixels within the overlap region and cuts between pixels with the lowest quality cost M.

The image region replacement system uses a smart graph cut algorithm using a method similar to that used described above to intelligently generate a replacement region border 602 within a plausible region. The image region replacement system uses the graph cut algorithm to avoid image artifacts that result from cutting through image structures 614a, 614b, and 614c by making cuts through the most consistent pixels. In particular, the image region replacement system can calculate quality costs based on pixel frequency and consistency between adjacent pixels located within the plausible region and use the graph cut algorithm to identify an optimal replacement region boundary 602. The graph cut algorithm can determine the quality cost M between two adjacent pixels s and t that copy from a plausible region of the reference image A and a plausible region from the target image B. In particular, the image region replacement system utilizes the following cost function:

$$M'(s, t, A, B) = \frac{M(s, t, A, B)}{\|G_A^d(s)\| + \|G_A^d(t) + G_B^d(s)\| + G_B^d(t)}$$

Here, d indicates the direction of the gradient and is the same as the direction of the edge between s and t. $G_A^d$ and $G_B^d$ are the gradients in the plausible region of the reference image A and the plausible region from the target image B along the direction d. M' penalizes boundaries going through high frequency regions more than those going through low frequency regions.

The "frequency" in an image refers to the rate of change of intensity per pixel. High frequency regions in an image have a high rate of change of intensity per pixel. On the other hand, if a change occurs over many pixels within a region, the region has a low frequency. For example, the image in FIG. 6B with a clear sky background with instances of people (including target instance of the person 604, reference instance of the person 606, first other face 612a, and 612b) and image structures 614a, 614b, and 614c in the foreground can include both high and low frequency areas. The clear sky background qualifies as a low frequency region since changes, if any, span many pixels. The edges of image structures 614a, 614b, and 614c, on the other hand, represent high frequency regions since pixels change rapidly over the short span of the edge of the image structures 614a, 614b, and 614c.

The image region replacement system uses a graph cut algorithm to identify the lowest quality cost M' within a plausible region to intelligently make a replacement region boundary 602 that will result in an enhanced image with the fewest possible image artifacts. In particular, and as illustrated in FIG. 6B, the image region replacement system identifies replacement region boundary 602, which has the lowest quality cost M'. Therefore, the replacement region boundary 602 cuts through the most consistent pixels and does not intersect image structures 614a, 614b, and 614c. Additionally, the pixels within the replacement region boundary 608 are constrained to come from the target image containing the target instance of the person 604. The pixels surrounding the replacement region boundary 608 are constrained to come from the reference image containing the reference instance of the person 606. Thus, the image replacement system generates a new image by replacing a reference region with a target region. More particularly, the reference region comprises the reference instance of the person 606 as well as the surrounding area defined by the replacement region boundary 602. The target region comprises the target instance of the person 610 as well as the surrounding area defined by the replacement region boundary 602.

Figure 7A:
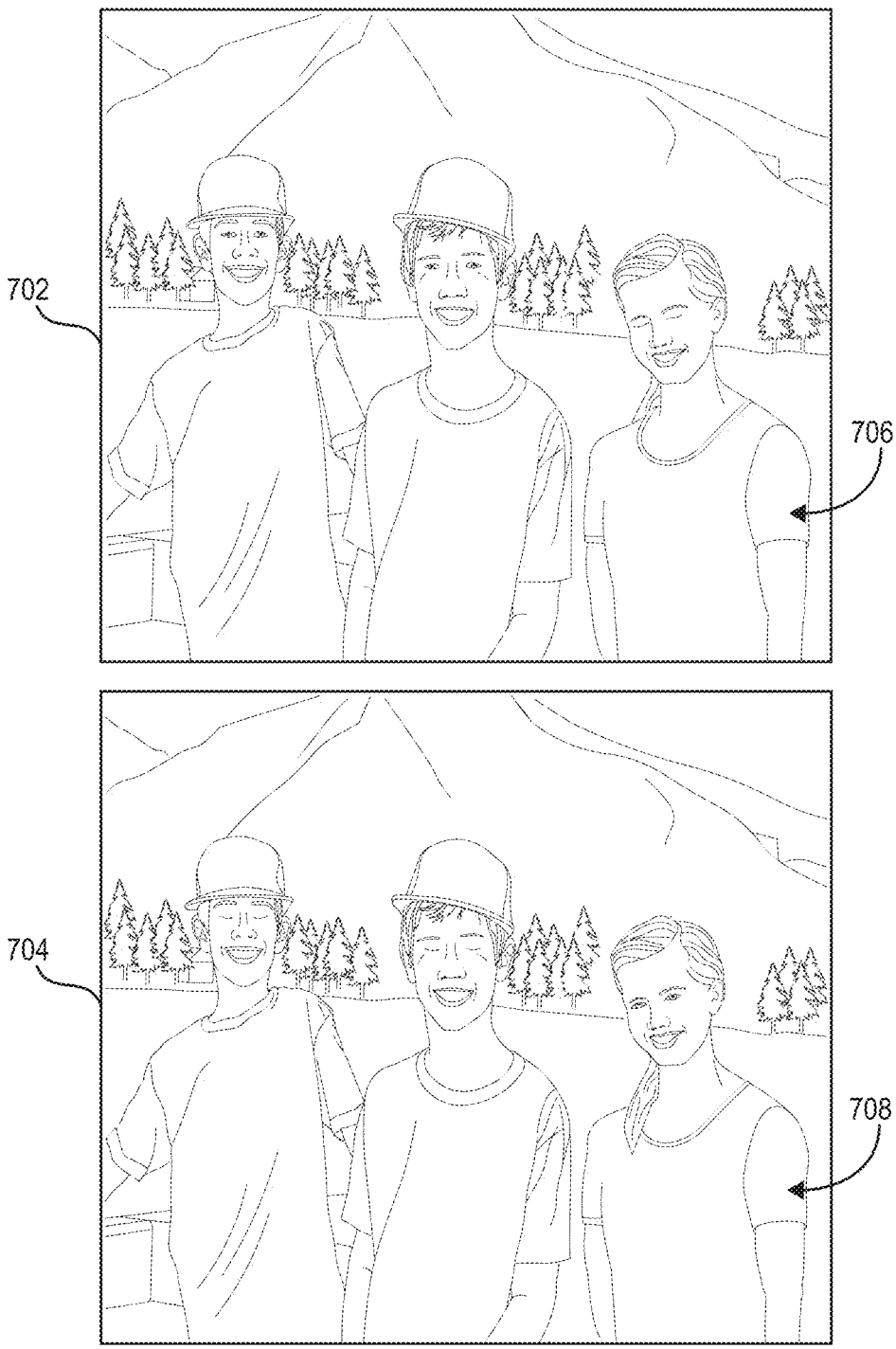
FIGS. 7A-7E illustrate a series of example images showing a process of automatically replacing a reference instance of a person with a target instance of a person in accordance with one or more embodiments.
Figure 7B:
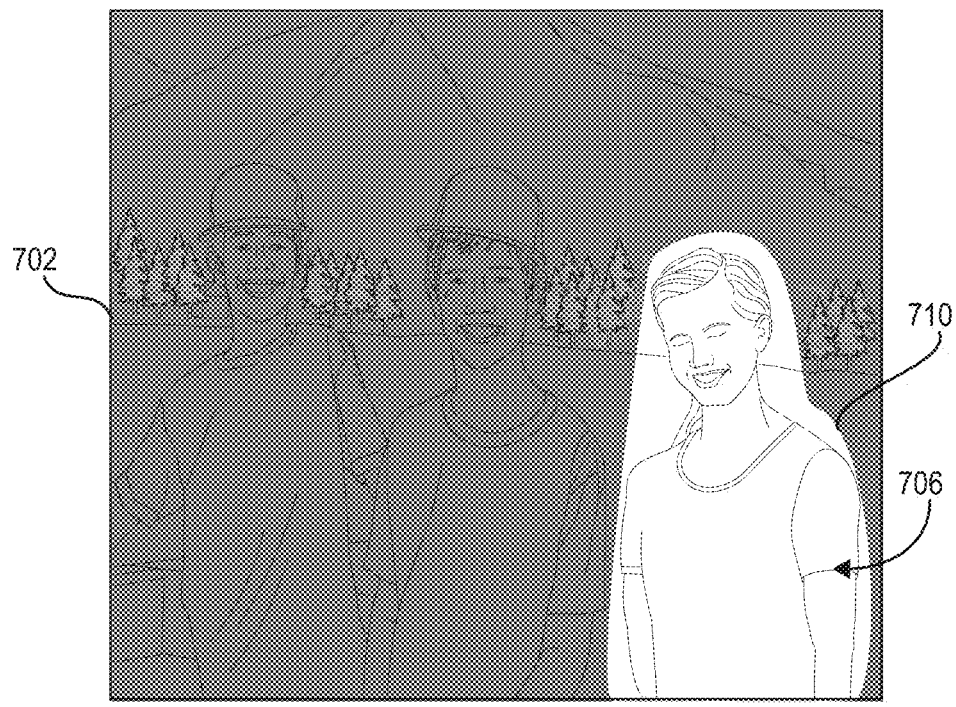
Figure 7C:
Figure 7D:
Figure 7E:
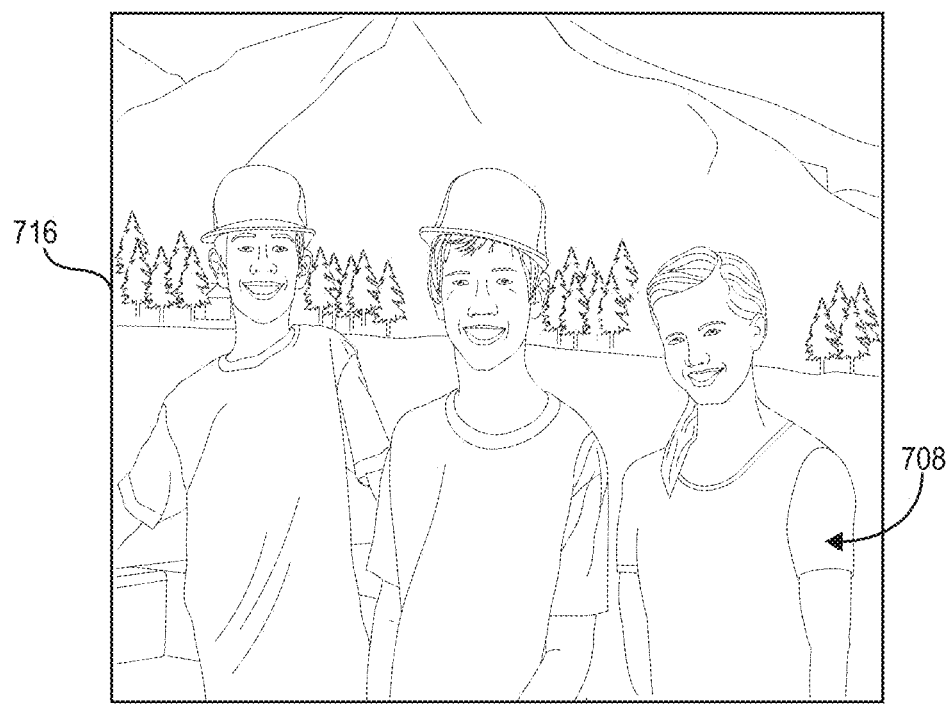

As mentioned above, the image region replacement system replaces a reference instance of a person with a target instance of a person. FIGS. 7A-7E illustrate a series of example images showing automatically replacing a reference instance of a person with a target instance of a person in a fully-automatic paradigm. In particular, FIG. 7A illustrates an example reference image 702 with reference instance of the person 706 and an example target image 704 with target instance of the person 708. FIGS. 7B-7D illustrate steps automatically taken by the image region replacement system in a fully-automatic paradigm to identify a replacement region boundary 714 around the reference instance of the person 706 and the target instance of the person 708. In particular, FIG. 7B illustrates identifying a reference neighborhood 710. FIG. 7C illustrates identifying target neighborhood 712 around a target instance of the person 708. FIG. 7D illustrates the replacement region boundary 714 generated by the graph cut algorithm. FIG. 7E illustrates an example enhanced image in which the reference region is replaced with the target region using Gaussian blending.

FIG. 7A illustrates the reference image 702 including the reference instance of the person 706 and the target image 704 including the target instance of the person 708. As illustrated in FIG. 7A, the image replacement system has already rated each score in the reference image 702 and determined that the reference instance of the person 706 has a low score (e.g., the reference instance of the person 706 has closed eyes). In particular, the image region replacement system detects all the faces in the reference image $I_r$ and has denoted the faces as $F_{r,k}$; $k \in \{1, \ldots, K\}$. For each face $F_{r,k}$; $k \in \{1, \ldots, K\}$, the image region replacement system assigns a score $S_{r,k}$; $k \in \{1, \ldots, K\}$. For each face $(F_{r,k})$ with a low score $(S_{r,k} < \delta)$, the image region replacement system detects faces in border area surrounding $(F_{r,k})$ across all images denoted as $T_{i,k}$, i.e., face of a person in the target image i corresponding to face k in the reference image. The image region replacement system calculates scores for $T_{i,k}$; $i \in \{1, \ldots, N\}$; $i \neq r$, and denote the scores as $S_{i,k}$.

The image region replacement system selects target image 704 from among the plurality of images based on rating each of the instances of the person represented by the reference instance of the person 706 across all the images. In particular, the image region replacement system finds the target instance of the person (i.e., the target face) using target face $t = \text{argmax}_i S_{i,k}$. In at least one embodiment, the image region replacement system selects the target instance of the person 708 that has the highest aesthetic rating.

The image region replacement system determines a reference neighborhood on the reference image 702. FIG. 7B illustrates the image region replacement system automatically identifying the reference neighborhood 710 around the reference instance of the person 706 on the reference image 702.

FIG. 7C illustrates automatically determining the target neighborhood 712 around the target instance of the person 708 on the target image 704. Because the image region replacement system independently determines the reference neighborhood 710 and the target neighborhood 712, the reference neighborhood 710 and the target neighborhood 712 may occupy different areas of the reference image 702 and the target image 704, respectively.

The image region replacement system uses the graph cut algorithm described above with respect to FIGS. 6A-6B to identify the replacement region boundary 714. In particular, for face $F_{r,k}$ and target face in frame t, $T_{t,k}$, the image region replacement system selects a replacement region $R_k$ with maximum consistency across images r and t over the boundary of the region $R_k$. For example, FIG. 7D illustrates that the replacement region boundary 714 cuts through the plausible region and avoids intersecting structures within the image. The image region replacement system uses the replacement region on the reference image 702 to define a reference region. In particular, the reference region comprises the replacement region boundary 714 around the reference instance of the person 712. The image region replacement system also uses the replacement region on the target image 704 to define a target region. In particular, the target region comprises the replacement region boundary 714 around the target instance of the person 708. Therefore, the replacement region boundary 714 illustrated in FIG. 7D also bounds the target region of target image 704.

FIG. 7E illustrates an enhanced image 716 in which the image region replacement system has replaced the reference instance of the person 706 with the target instance of the person 708. In particular, the image region replacement system utilizes Gaussian blending to replace reference region with the target region. In particular, in reference image $I_r$, the image region replacement system replaces region $R_k$ (specified with a mask with values of 0 and 1) with pixels in $I_r$. The image region replacement system applies a Gaussian smoothing with kernel size d and sigma $\sigma$ on $R_k$ to obtain $R_k^{(s)}$. Next, the image replacement system sets alpha channel of $I_r$ to $R_k^{(s)}$, draws $I_t$ and then $I_r$ on top of that to perform alpha blending of $I_t$ and $I_r$, and sets $I_r$ to be result of the blending. Thus, the enhanced image 716 will have the final smart mix and match result.

Figure 8A:
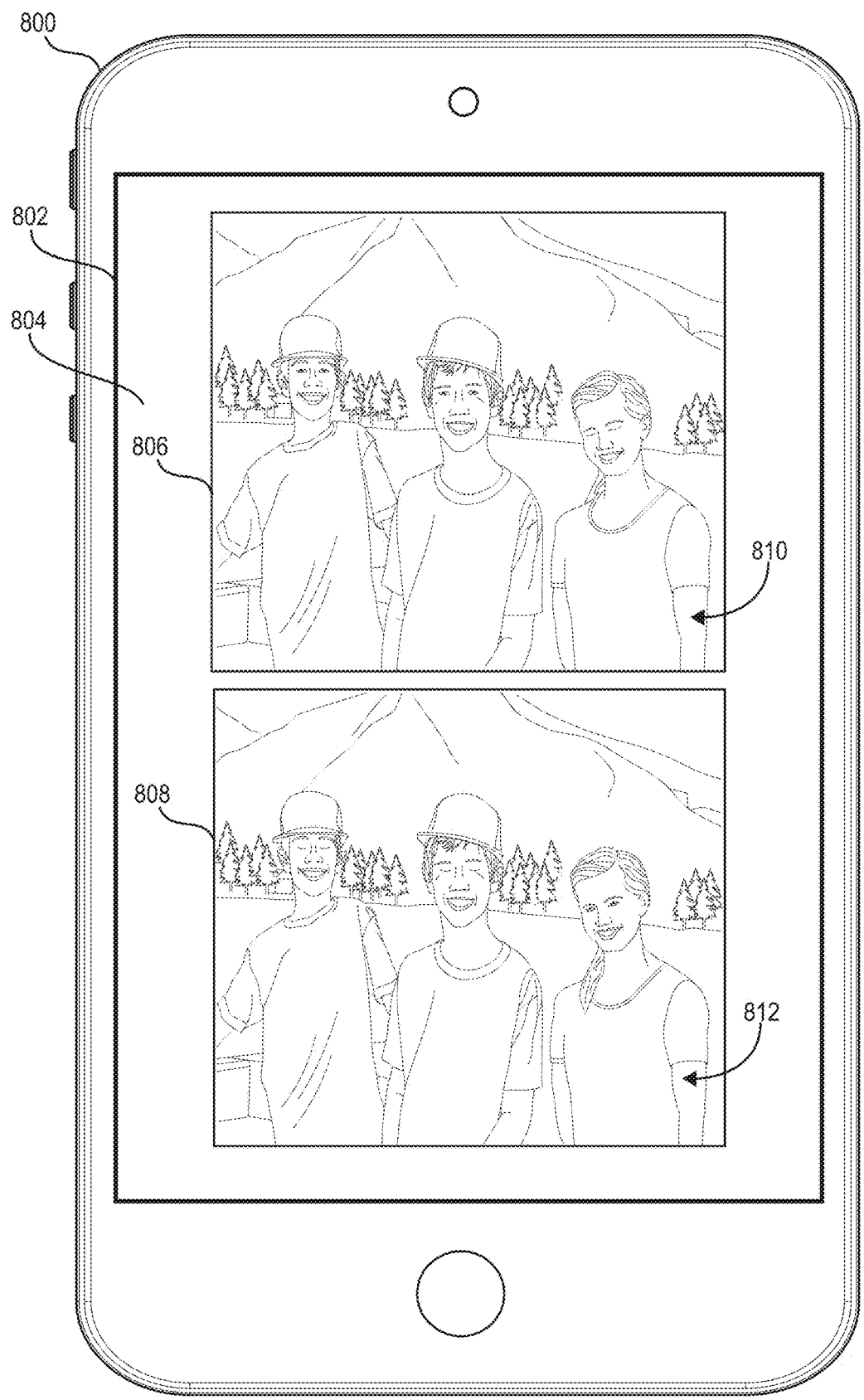
FIGS. 8A-8E illustrate graphical user interfaces showing a process of using manual feedback to replace a reference instance of a person with a target instance of a person in accordance with one or more embodiments.

FIGS. 8A-8E illustrate an example of how an interactive paradigm for replacing a reference region with a target region appears to a user via a client-computing device. Specifically, FIG. 8A illustrates a client-computing device 800 with a display 802 (in one or more embodiments a touch screen) that includes a user interface 804. As shown in FIG. 8A, the user interface 804 is associated with an application. The application may be an embodiment of an image management system. The user interface 804 includes selectable elements 806 (for interacting with the reference image) and 808 (for interacting with the target image).

As illustrated by FIG. 8A, the image region replacement system automatically selects, for the user, a reference image with the reference instance of the person 810. In particular, the image region replacement system displays the reference image $I_r$ to the user. In at least one embodiment, the user selects the face to replace. In particular, the user may choose the target image by tapping on a face in the reference image 806. In response, the image region replacement system can present, to the user, the plurality of instances of the selected face. The user may then select the target face.

In at least one other embodiment, the image replacement region automatically selects the target image with the target instance of the person 812. This way, the user does not need to search through the plurality of images captured by the camera or client device. In addition, the user continues to receive the benefit of having multiple images taken to capture a common moment. In this manner, the user is provided with a selected reference image with the reference instance of the person 810 and the selected target image with the target instance of the person 812.

Figure 8B:
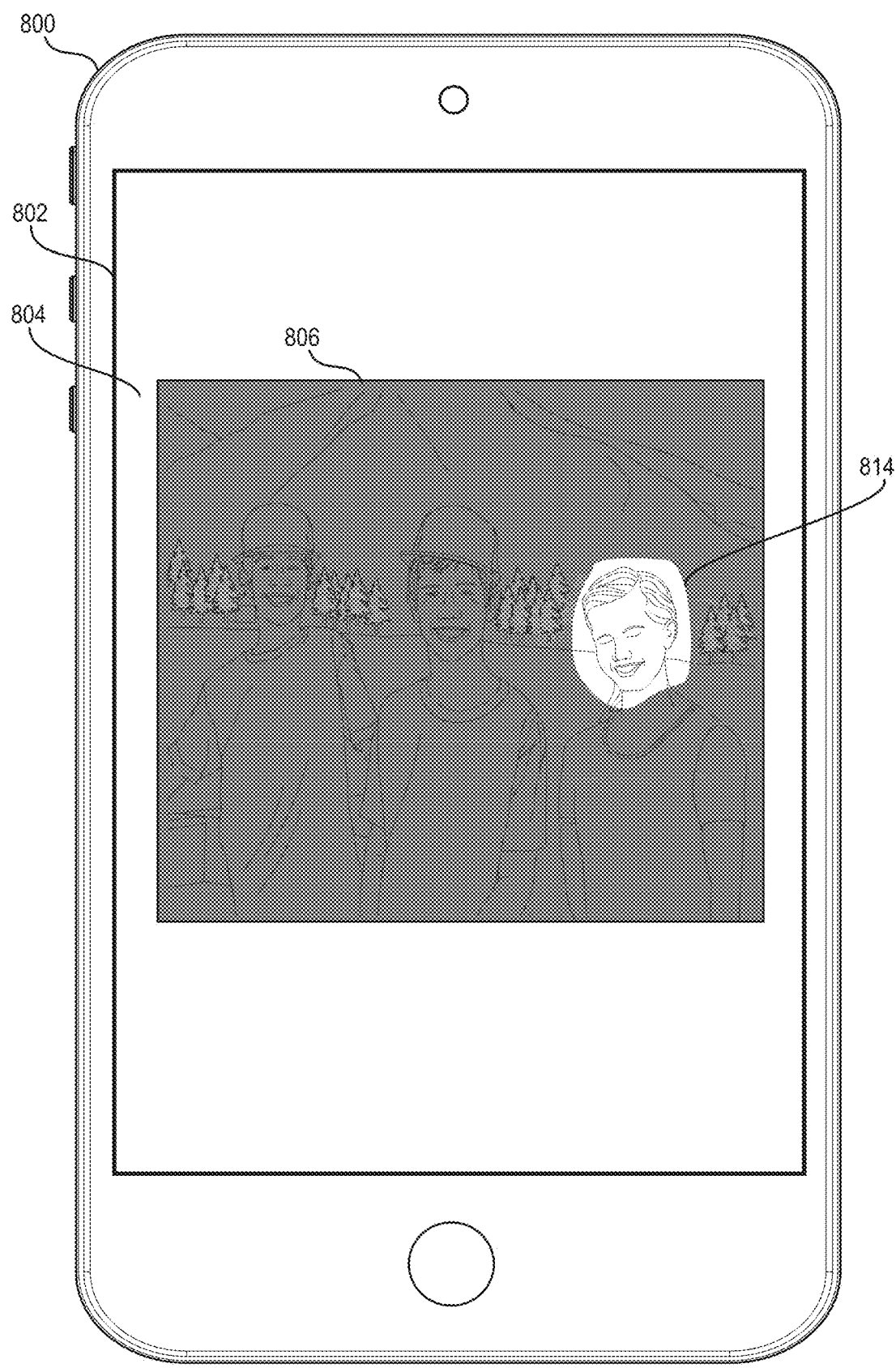

FIG. 8B illustrates the selected reference image 806. The user can interact with the reference image 806 to identify the person to replace. In particular, and as illustrated by FIG. 8B, the user has tapped and selected a user-selected plausible region 814. The user can use a brush tool to interactively select the plausible region. For each face that the user wants to replace, the image region replacement system sets default target frame t=0, sets the user-selected plausible region 814 R by the user to be blank, and for each interaction of the user with target frame selection slider update t. For each tap on the screen by the user (denoting the touched areas collectively as R) or updates from target frame selection slider, in the reference instance of the person $I_r$, the image region replacement system replaces region R (specified with a mask with values of 0 and 1) with pixels in the target instance of the person $I_t$ via Gaussian blending.

In at least one embodiment, the image replacement system uses the user-selected plausible region 814 as the plausible region in which the graph cut algorithm automatically identifies the replacement region boundary. In at least one embodiment, image region replacement system detects faces within the user-selected plausible region 814 and constrains the graph cut algorithm to avoid pass through any detected faces. The image region replacement system automatically identifies the reference region and the target region and replaces the reference region with the target region. In at least one embodiment, the graph cut algorithm is constrained to pass as close as possible to the border of the user-selected plausible region 814 while still passing through consistent pixels and avoiding image structure.

Figure 8C:
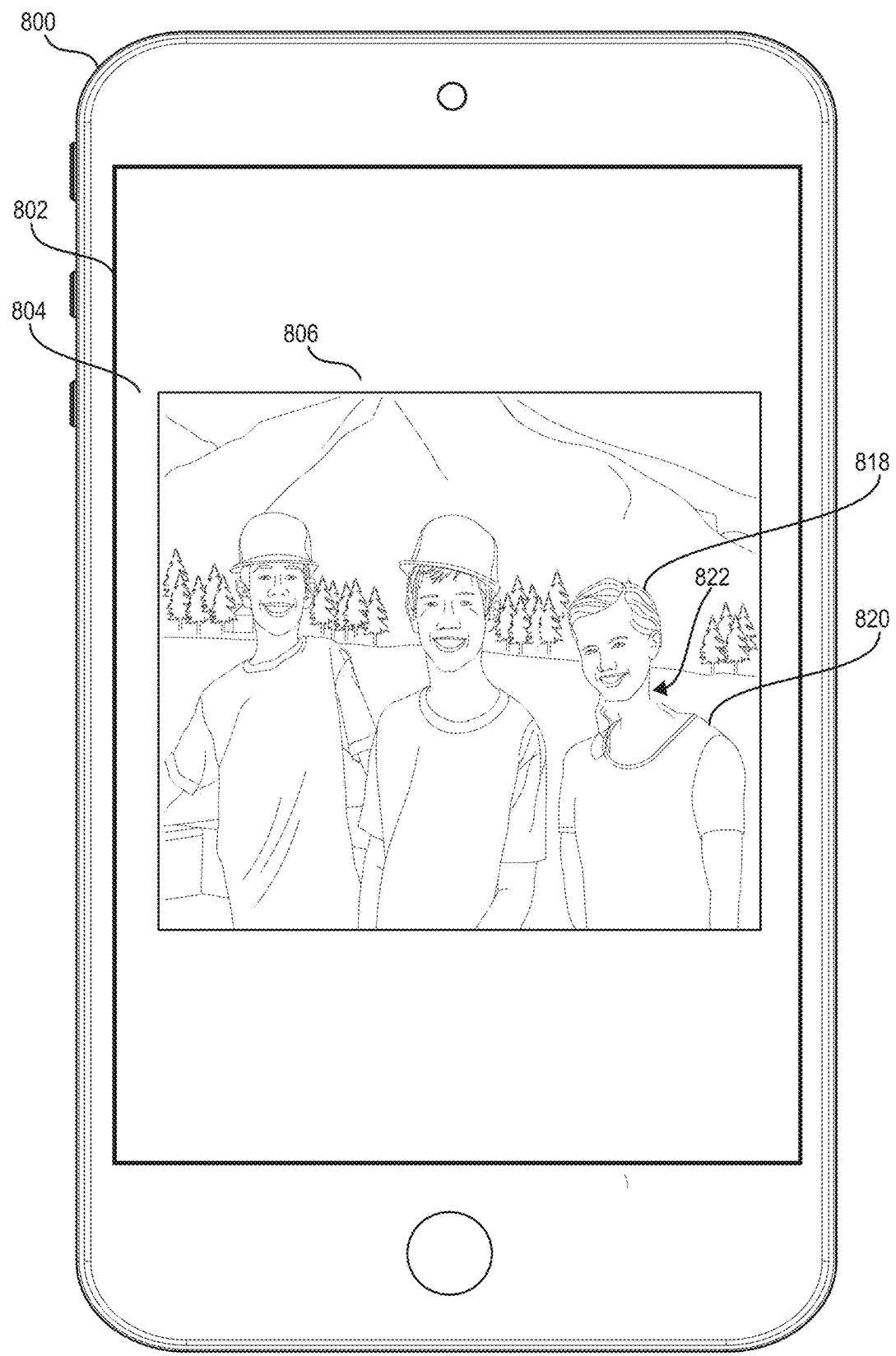

Based on the user-selected plausible region 814, the image region replacement system returns a draft image 816 to the user as illustrated in FIG. 8C. The draft image 816 is created using Gaussian blending. In particular, the image region replacement system applies a Gaussian smoothing with kernel size d and sigma σ on R to obtain $R^{(s)}$. The image region replacement system sets alpha channel of $I_r$ to $R^{(s)}$, draws the target instance of the person $I_t$ and then the reference instance of the person $I_r$ on top of that to perform alpha blending of $I_t$ and $I_r$.

As illustrated, the image region replacement system has replaced the target portion of the person 818 corresponding to the user-selected plausible region 814. However, the draft image 816 includes an image artifact 822 resulting from the target portion of the person 818 being misaligned with the reference portion of the person 820. In some embodiments, the image region replacement system can automatically detect image artifacts 822 and notify the user that the draft image 816 contains an image artifact 822. In at least one embodiment, the image region replacement system only presents, to the user, the draft image 816, and provides the user the option to adjust the user-selected plausible region. In either case, the image region replacement system presents, to the user, the reference image 806 showing the user-selected plausible region 814.

Figure 8D:
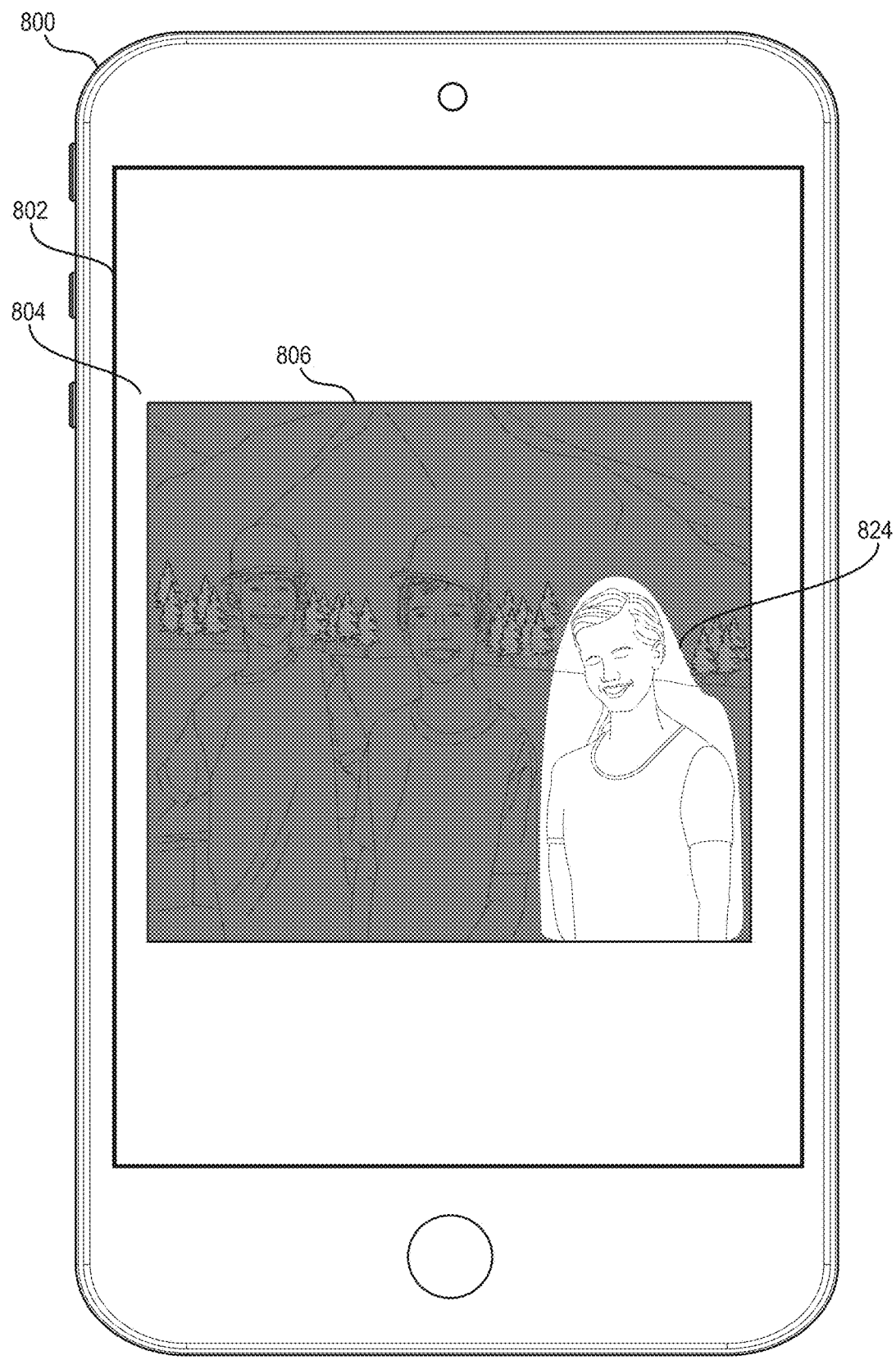

The user can correct the user-selected plausible region on the reference image 806 to eliminate inconsistencies or artifacts in the draft image. For example, as shown in FIG. 8D, the user has selected a corrected user-selected plausible region 824 by expanding the user-selected plausible region 814. As illustrated, the corrected user-selected plausible region 824 includes the area in which the image artifact 822 existed. Based on the corrected user-selected plausible region 824, the image region replacement system again uses the graph cut algorithm to pass through the boundary of the user-selected plausible region 824 to generate a replacement region boundary.

Figure 8E:
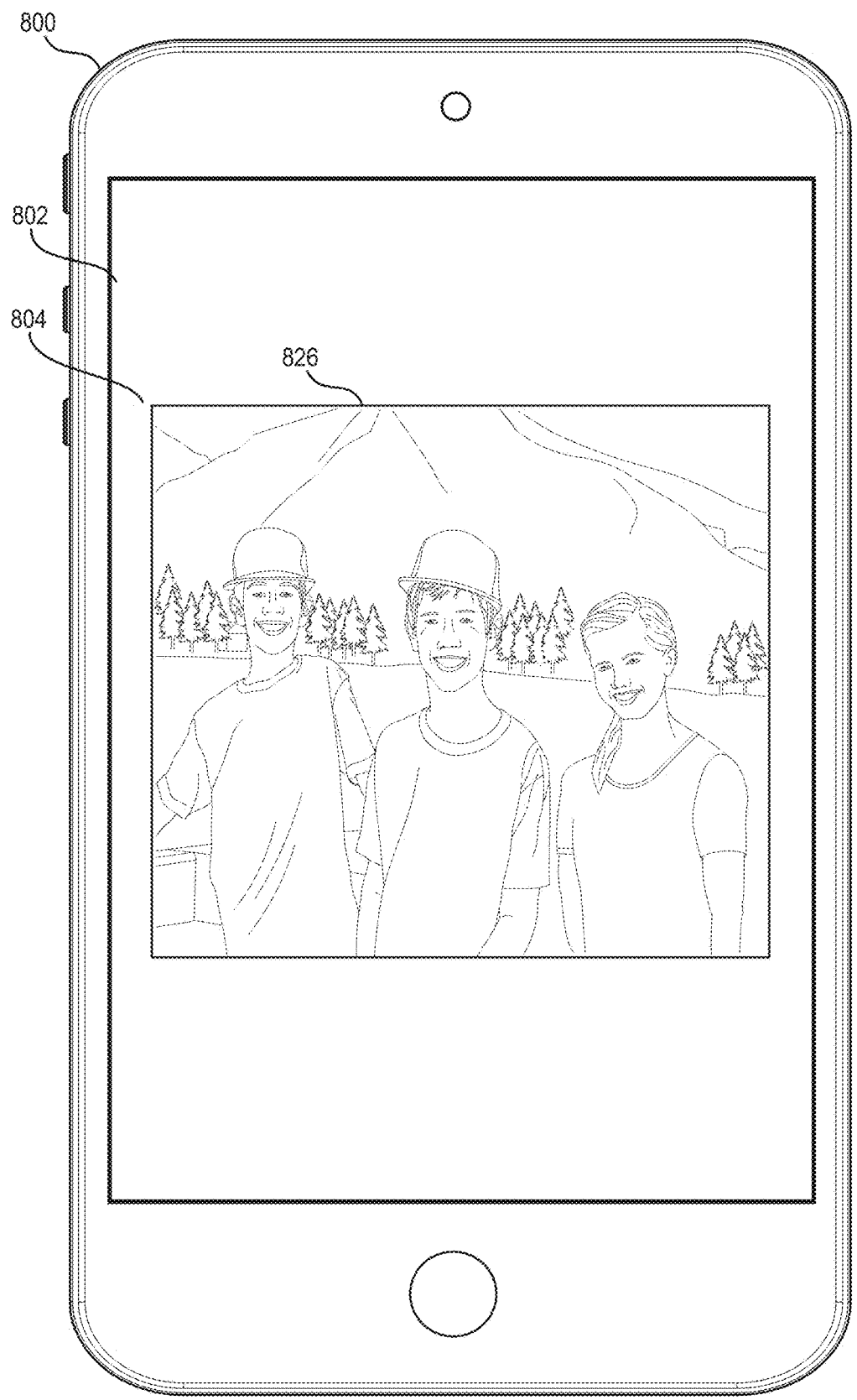

As illustrated in FIG. 8E, the enhanced image 826 does not have the image artifact 822 as did the draft image 816. This is a result of the user expanding the user-selected plausible region. In at least one other embodiment, the image region replacement system can continue to present, to the user, the option to adjust the user-selected plausible region to eliminate image artifacts as they arise.

Figure 9:
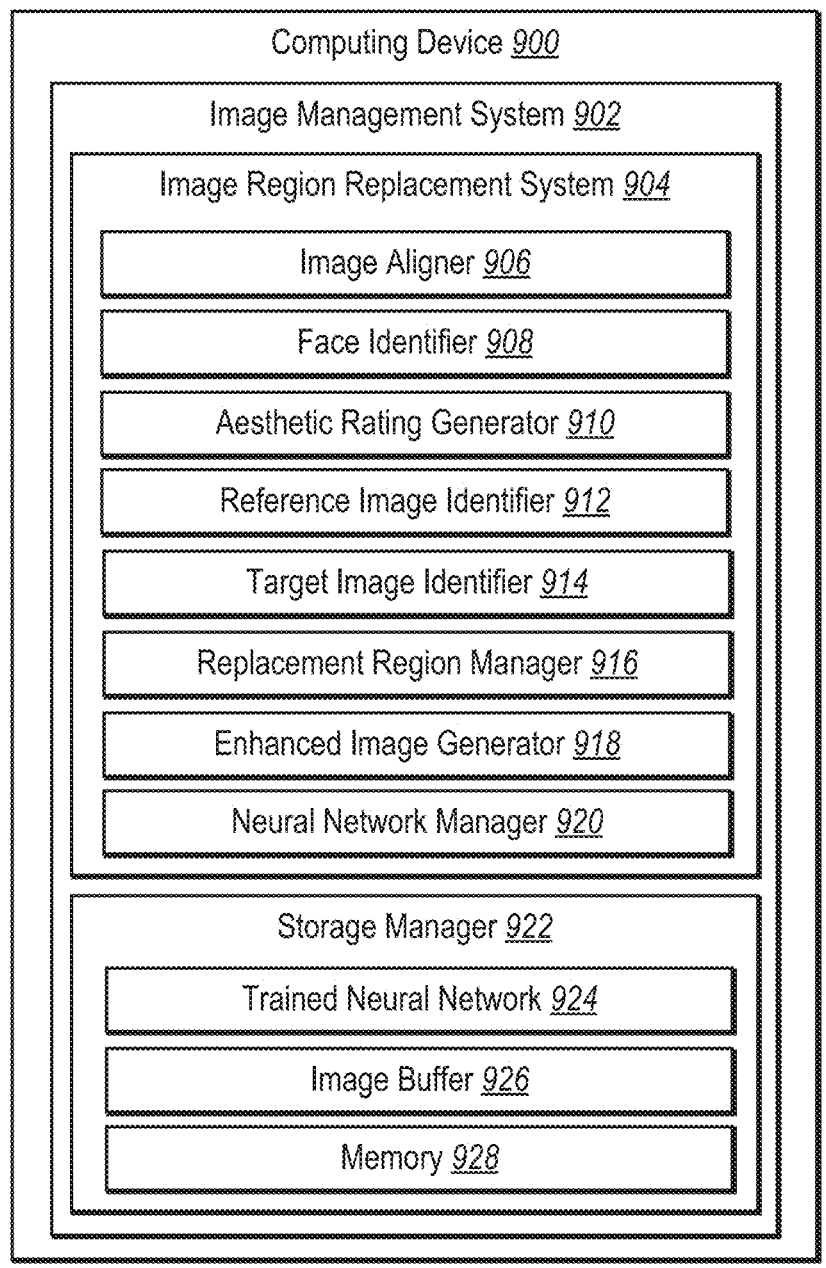
FIG. 9 illustrates a schematic diagram of an image region replacement system in accordance with one or more embodiments.

Turning now to FIG. 9, additional detail will be provided regarding components and functionality of the image region replacement system 904 in accordance with one or more embodiments. In particular, FIG. 9 illustrates a computing device 900 implementing an image management system 902. The image management system 902 can include the image region replacement system 904. The image region replacement system 904 can include the image aligner 906, the face identifier 908, the aesthetic rating generator 910, the reference image identifier 912, the target image identifier 914, the replacement region manager 916, the new image generator 918, the neural network manager 920, and the storage manager 922. The storage manager 922 may include the trained neural network 924, the image buffer 926, and memory 928.

As just mentioned, the computing device 900 can include the image management system 902. The image management system 902 can access, identify, modify, revise, and/or provide digital visual media (such as images and videos). For example, the image management system 902 can comprise an application that allows for capturing, editing, and/or sharing digital images or videos. For example, the image management system 902 can aid users in capture, editing (adding filters, masks, frames, etc.), and sharing digital images (e.g., via a social network or uploading to a cloud-based repository). In one or more embodiments, the image management system 802 can comprise a digital image editing application or digital image capturing application, including but not limited to ADOBE® PHOTOSHOP®, ADOBE® LIGHTROOM®, or ADOBE® PREMIERE®. "ADOBE," "PHOTOSHOP," "LIGHTROOM," and "PREMIERE" are either registered trademarks or trademarks of Adobe Systems Incorporated in the United States and/or other countries. In any event, the image management system 902 can implement the image region replacement system 904.

The image region replacement system 904 can include a plurality of components as described above. Utilizing the plurality of components, the image region replacement system 904 can mix and match regions of images, as described in detail above. By way of example, the image region replacement system 904 can generate a plurality of aesthetic ratings for a plurality of instances of a person from a plurality of images. The image region replacement system 904 identifies a reference image and a target image. Using a graph cut algorithm, image region replacement system 904 identifies a replacement region that has a boundary that passes around the reference instance of the person and the target instance of the person through consistent pixels in the reference image and the target image, respectively. The image region replacement system 904 generates a new image by replacing a reference region from the reference image that corresponds with the replacement region with the target region from the target image that corresponds with the replacement region.

The image region replacement system 904 includes the image aligner 906. The image aligner 906 aligns a plurality of images with respect to a reference image. For example, the image aligner 906 can use the plurality of images and a corresponding gyroscope dataset to align a plurality of images from a burst of images.

The image region replacement system 904 further includes the face identifier 908. In particular, the face identifier 908 identifies faces and instances of people generally. The face identifier identifies faces within a reference image. The face identifier 908 can utilize face detection technology to identify faces or instances of people in the reference image. The face identifier 908 can also identify instances of people associated with faces. For example, though the face identifier 908 can identify a sole face in a reference image and in a target image, the face identifier 908 can also identify the body of the person corresponding to the face.

The image region replacement system 904 also includes aesthetic rating generator 910. The aesthetic rating generator 910 can an aesthetic rating for an instance of a person, as described in detail above. For example, using one or more weight-adjusted attribute scores associated with an instance of a person, the aesthetic rating generator 910 can generate an aesthetic score for an instance of a person.

The image region replacement system 904 includes reference image identifier 912. The reference image identifier 912 designates an image as the reference image. For instance, the reference image identifier 912 can select the least blurry image, the image with the maximum number of desirable faces, or simply the first image in the set of photos.

The image region replacement system 904 also includes the target image identifier 914. The target image identifier 914 identifies the target image by identifying the image that contains the instance of the person with the highest aesthetic ranking. In particular, the target image identifier 914 can create a border area around a reference instance of a person and identify other instances of the person in the corresponding border area across the plurality of images. Instead of using face detection technology to identify each face in each of the plurality of images, the target image identifier 914 can efficiently identify instances of the person across the plurality of images. The target image identifier 914 accesses the aesthetic rankings for each instance of the person detected within the border area across the plurality of images. The target image identifier 914 designates the image with the highest-scoring instance of the person as the target image.

The replacement region manager 916 is located on the image region replacement system 904 and identifies a replacement region that includes the reference instance and target instance of the person. Additionally, the replacement region manager 916 makes sure that the boundary of the replacement region passes through consistent pixels and the target image by using a graph cut algorithm constrained to pass through consistent pixels while avoiding structure in the reference image and the target image. More specifically, the replacement region manager determines a plausible area based on neighborhoods around the reference instance of the person and the target instance of the person. The replacement region manager 916 further uses a graph cut algorithm constrained to pass through consistent pixels in the target image and the reference image to create a replacement region boundary. The replacement region manager 916 identifies a reference region comprising the replacement region boundary around the reference instance of the person. Additionally, the replacement region manager 916 identifies a target region comprising the replacement region boundary around the target instance of the person.

The image region replacement system 904 also includes new image generator 918. The new image generator 918 replaces the pixels in the reference image comprising the reference region with pixels from the target image comprising the target region. More particularly, the new image generator 918 generates the new image using Gaussian blending.

In addition to the above-mentioned components, the image region replacement system 904 may include the neural network manager 920. The neural network manager 920 can provide, manage, train, and/or control a neural network(s) as described above. For example, the neural network manager 920 applies a trained neural network to digital images.

The image region replacement system 904 also includes the storage manager 922. Specifically, the storage manager 922 can maintain data of any type, size, or kind, as necessary to perform the functions of the image region replacement system 904. Although not illustrated, the storage manager 922 can maintain other data including an aesthetic rating, attribute weights value, or other information discussed herein.

Moreover, the storage manager 922 can provide, manage, and/or control the trained neural network 924, the image buffer 926, and the memory 928. For example, the storage manager 922 determines when to store the plurality of images from the burst of images in the image buffer 926, and when to delete the plurality of images from the image buffer 926. Moreover, the storage manager 922 maintains the trained neural networks, including updating the trained neural network 924 as directed by the image region replacement system 904. Additionally, the storage manager 922 controls interaction with the client device memory 928 (e.g., directing where in the client device memory to store a selected image provided by the image region replacement system 904).

Each of the components 904, 906, 908, 910, 912, 914, 916, 918, 920, and 922 ("the plurality of components") of the image region replacement system 904 and their corresponding elements may be in communication with one another using any suitable communication technologies. It will be recognized that although the plurality of components and their corresponding elements are shown to be separate in FIG. 9, any of the plurality of components and their corresponding elements may be combined into fewer components, such as into a single facility or module, divided into more components, or configured into different components as may serve a particular embodiment.

The plurality of components and their corresponding elements can comprise software, hardware, or both. For example, the plurality of components and their corresponding elements can comprise one or more instructions stored on a computer-readable storage medium and executable by processors of one or more computing devices. The plurality of components and their corresponding elements can comprise hardware, such as a special purpose processing device to perform a certain function or group of functions. Additionally, or alternatively, the plurality of components and their corresponding elements can comprise a combination of computer-executable instructions and hardware.

Furthermore, the plurality of components of the image region replacement system 904 may, for example, be implemented as one or more stand-alone applications, as one or more modules of an application, as one or more plug-ins, as one or more library functions or functions that may be called by other applications, and/or as a cloud-computing model. Thus, the plurality of components of the image region replacement system 904 may be implemented as a stand-alone application, such as a desktop or mobile application. Furthermore, the plurality of components of the image region replacement system 904 may be implemented as one or more web-based applications hosted on a remote server. Alternatively, or additionally, the components of the image region replacement system 904 may be implemented in a suit of mobile device applications or "apps."

Figure 10:
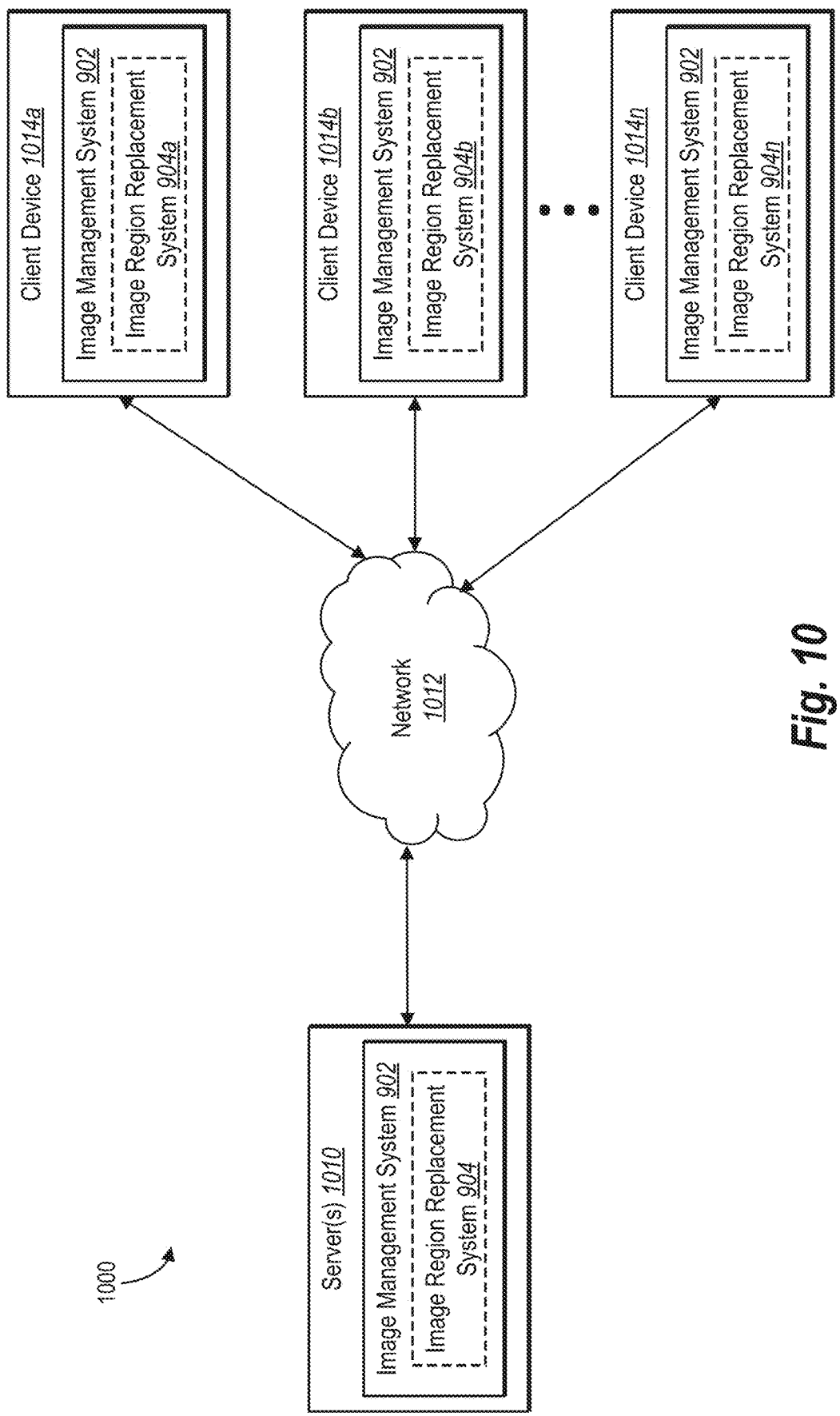
FIG. 10 illustrates a schematic diagram of a network environment in which an image region replacement system can be implemented in accordance with one or more embodiments.

The plurality of components described above for operating the image region replacement system may be implemented in a system environment. Specifically, FIG. 10 illustrates a schematic diagram of one embodiment of an exemplary system environment ("environment") 1000 in which an image region replacement system 904 can operate. As illustrated in FIG. 10, the environment 1000 can include a server(s) 1010, a network 1012, and a plurality of client devices 1014a-1014n. The server(s) 1010, the network 1012, the plurality of client devices 1014a-1014n, and the other components of the environment 1000 may be communicatively coupled with each other either directly or indirectly (e.g., through the network 1012).

As illustrated in FIG. 10, the environment 1000 can include the server(s) 1010. The server(s) 1010 may generate, store, receive, and/or transmit any type of data. The server(s) 1010 can comprise a communication server or a web-hosting server. In one or more embodiments, the server(s) 1010 may comprise a data server.

Moreover, as illustrated in FIG. 10, the environment 1000 can include the plurality of client devices 1014a-1014n. The plurality of client devices 1014a-1014n may comprise a variety of different computing devices, such as personal computers, laptop computers, mobile devices, smartphones, tablets, special purpose computers, TVs, or other computing devices. As illustrated in FIG. 10, the plurality of client devices 1014a-1014n, and/or the server(s) 1010 may communicate via the network 1012.

As illustrated, the image management system 902, and the image region replacement system 904 can be implemented by a variety of components in the environment 1000. Specifically, the image management system 902, and the image region replacement system 904, may be implemented in whole or in part via the server(s) 1010, and/or the plurality of client devices 1014a-1014n. For example, the server(s) 1010 can host the neural networks utilized to compute the aesthetic ratings, while the plurality of client devices 1014a-1014n can implement the image replacement region selection process. When implemented in part on the server(s) 1010, and in part on the plurality of client devices 1014a-1014n, the image management system 902, and the image region replacement system 904 are communicatively coupled (i.e., via the network 1012).

The image management system 902 can manage the image region replacement system 904. For instance, the image management system 902 can activate the image region replacement system 904, send and receive requests to/from the image region replacement system 904, and provide the selected image received from the image region replacement system 904 to the client device 1014.

Moreover, the image region replacement system 904 can operate as described above in relation to FIGS. 1-9. Specifically, the image region replacement system 904 can generate a plurality of aesthetic ratings for a plurality of instances of a person from a plurality of images including a reference image with a reference instance of the person. The image region replacement system 904 can also identify a target instance of the person based on the plurality of aesthetic ratings. The image region replacement system 904 will determine a replacement region, which includes the reference instance and target instance of the person, having a boundary passing through consistent pixels in the target image and the reference image, and the image region replacement system 904 will generate a new image by replacing a reference region from the reference image with a target region from the target image.

Although FIG. 10 illustrates a single server(s) 1010, it will be appreciated that the server(s) 1010 can represent any number of server computing devices. Similarly, although FIG. 10 illustrates a particular arrangement of the server(s) 1010, network 1012, and the plurality of client devices 1014a-1014n, various additional arrangements are possible.

Figure 11:
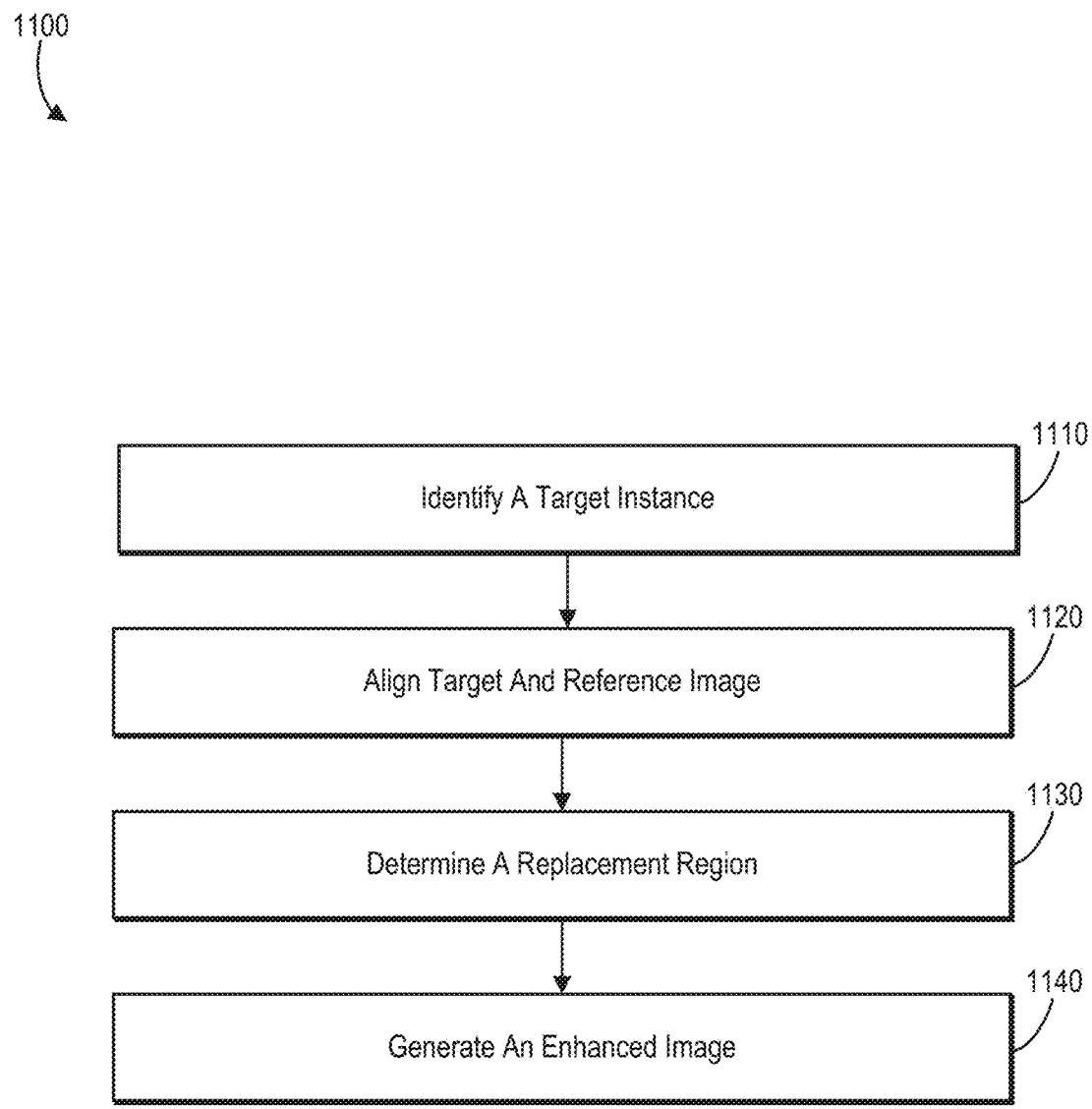
FIG. 11 illustrates a flowchart of series of acts for switching replacement regions in a reference image and a target image in accordance with one or more embodiments.

FIGS. 1-10, the corresponding text, and the examples, provide a number of different systems and devices that allows a user to facilitate the generation of a high-quality group portrait. In addition to the foregoing, embodiments can also be described in terms of a series of acts for accomplishing a particular result. For example, FIG. 11 illustrates a flowchart of a series of acts 1100 for image replacement region selection in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions that, when executed by one or more processors, cause a computing device to perform the acts of FIG. 11. In still further embodiments, a system can perform the acts of FIG. 11.

As illustrated in FIG. 11, the series of acts 1100 can comprise an act 1110 of identifying a target instance. For example, act 1100 can comprise identifying a target instance of a person in a target image from a plurality of images. The plurality of images can include a plurality of instances of the person and a reference image with a reference instance of the person. In one or more embodiments, act 1110 involves receiving, from a user of the computing device, a user selection of the target instance of the person. For example, act 1110 can involve receiving a user selection (e.g., receiving or detecting a tap on a touch screen 802 of a computing device 800 in an area in which a face of the person is displayed) of a target instance of the person.

Alternatively, act 1110 can involve generate a plurality of aesthetic ratings for the plurality of instances of the person from the plurality of images. Then act 1110 can involve selecting an instance of the person with the highest aesthetic rating as the target instance. Act 1110 can involve selecting the instance of the person automatically or without user input. Thus, in one or more embodiments, act 1110 involve automatically identifying the highest quality instance of a face of a person from a plurality of images without displaying each of the images to the user or requiring the user to scan through the plurality of images to identify the target instance. In one or more embodiments, act 1110 involves to generating the plurality of aesthetic ratings using one or more neural networks 300, 230 having classifiers 304, 314a-314n trained to generate attribute ratings for the plurality of instances of the person. Additionally, act 1110 can involve associating a weight with each attribute rating and combining the weighted attribute weights to generate an aesthetic rating.

The series of acts 1100 also comprises an act 1120 of aligning the target image and the reference image. For example, act 1120 can comprise identifying a first gyroscope data set corresponding to the reference image and a second gyroscope data set corresponding to the target image; detecting a first set of feature points within the reference image and a second set of feature points within the target image; and applying an image-alignment model from a pixel-adjusted-gyroscope-alignment model and a feature-based-alignment model to align the target image with the reference image based on the first and second gyroscope datasets and one or both of the first and second sets of feature points. Alternatively, act 1120 can involve determining on a feature-point-deficiency metric; selecting an image-alignment model from a pixel-adjusted-gyroscope-alignment model and a feature-based-alignment model based on the feature-point-deficiency; and applying the selected image-alignment model to the target image and the reference image to determine an alignment between the target image and the reference image. Furthermore, in one or more embodiments, act 1120 can further involve superimposing the aligned target image over the reference image.

The series of acts 1100 comprises an act 1130 of determining a replacement region. For example, act 1130 can comprise determining a replacement region, which includes the reference instance and target instance of the person, having a boundary passing through consistent pixels in the target image and the reference image. Furthermore, the act 1130 can involve using a cut-graph algorithm that identifies the boundary from a plausible boundary region by identifying pixels with a maximum consistency and minimal passage across structured objects in the target and reference images. In particular, act 1130 can comprise identifying adjacent pixels within the plausible region with the lowest quality cost. More particularly, act 1130 can involve using a graph cut algorithm constrained to pass through consistent pixels while avoiding structure in the reference image and the target image. For example, act 1130 can involve penalizing potential boundaries going through high frequency regions more than potential boundaries going through low frequency areas.

In such embodiments, act 1130 can involve determining the plausible boundary region by combining a reference neighborhood around the reference instance of the person and a target neighborhood around the target instance of the person, and wherein the plausible region excludes instances of other people. In particular, act 1130 can involve generating a union of the target neighborhood and the reference neighborhood and subtracting portions of the target and reference neighborhoods including faces. Subtracting portions of the target and reference neighborhoods including faces can involve subtracting face of the target instance of the person, the reference instance of the person, and faces of other persons. Act 1130 can further involve generating the reference neighborhood by expanding a contour of the reference instance of the person and generating the target neighborhood by expanding a contour of the target instance of the person. Thus, in one or more embodiments, act 1130 involves determining the plausible boundary region automatically or without user input.

In alternative embodiments, act 1130 can involve receiving, from a user of the computing device, a selection of the plausible region on the reference image. For example, act 1130 can involve detecting that a user has tapped and selected a user-selected plausible region 814. In one more embodiments, act 1130 involves detecting the use of a brush tool activated by a user to interactively select the plausible region.

The series of acts 1100 comprises an act 1140 of generating an enhanced image. For example, act 1140 can comprise generating an enhanced image by replacing a reference region from the reference image that corresponds with the replacement region with a target region from the target image that corresponds with the replacement region. More particular, act 1140 can involve replacing the reference region with pixels form the target region using Gaussian blending. For example, act 1140 can involve applying alpha blending on the target region and the reference region.

In addition (or in the alternative) to the acts describe above, in some embodiments, the acts 900 include performing a step for aligning a plurality of images including a plurality of instances of a person, wherein the plurality of images comprises a reference image with a reference instance of the person. For instance, the algorithm and acts described in reference to FIGS. 4-5B can comprise the corresponding acts for performing a step for aligning a plurality of images including a plurality of instances of a person, wherein the plurality of images comprises a reference image with a reference instance of the person. Similarly, the algorithms and acts described in relation to FIGS. 6A-6B can further comprise corresponding acts for performing a step for determining a replacement region, which includes a reference instance from a reference image and a target instance of the person, having a boundary passing through consistent pixels in the target image and the reference image. Still further, the algorithms and acts described in relation to FIGS. 3A-3B can further comprise corresponding acts for a step for generating a plurality of aesthetic ratings for the plurality of instances of the person.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
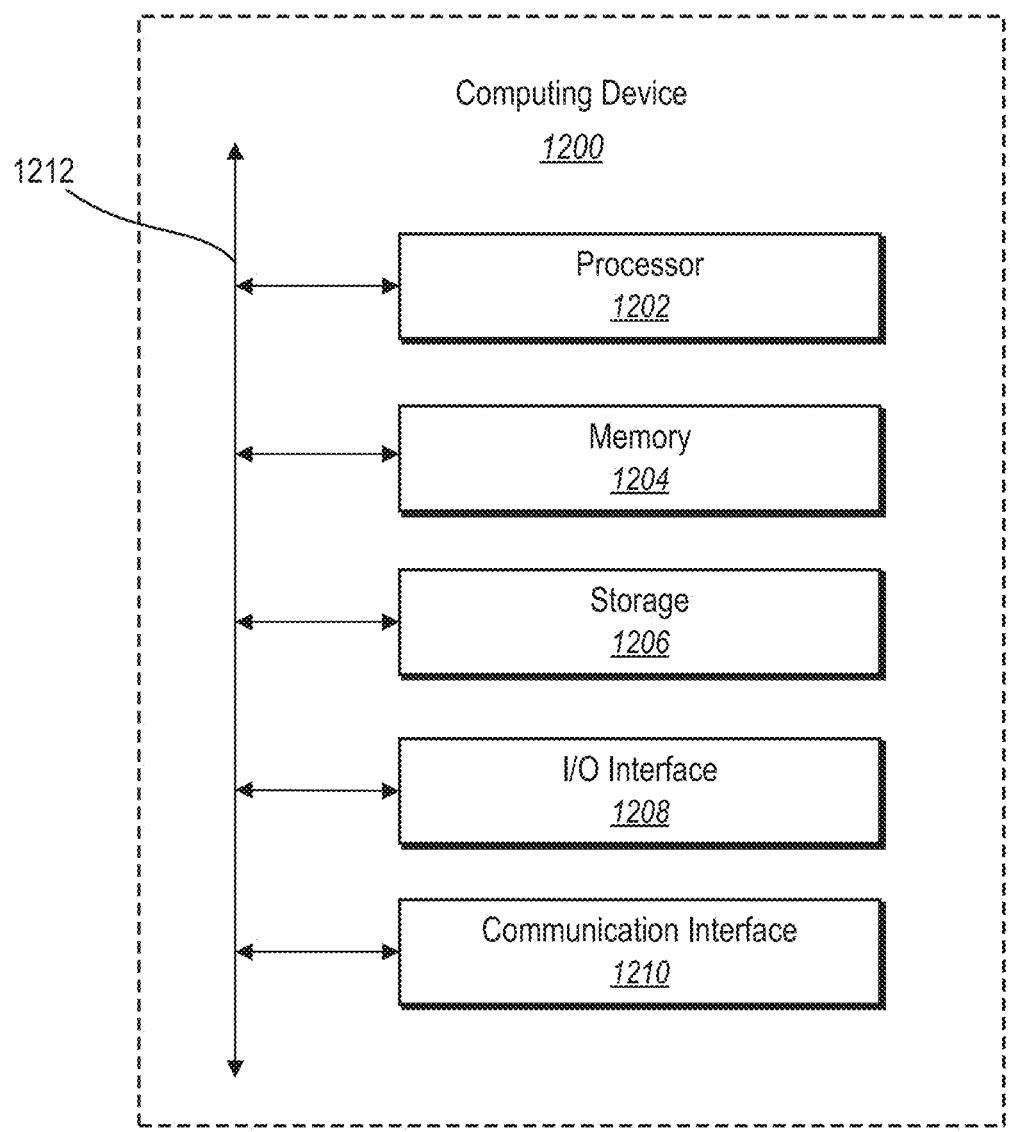
FIG. 12 illustrates a block diagram of an exemplary computing device in accordance with one or more embodiments.

FIG. 12 illustrates a block diagram of an exemplary computing device 1200 that may be configured to perform one or more of the processes described above. One will appreciate that one or more computing devices such as the computing device 1200 may implement one or more components of the image region replacement system. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. While an exemplary computing device 1200 is shown in FIG. 12, the components illustrated in FIG. 12 are not intended to be limiting. Additional or alternative components may be used in other embodiments. Furthermore, in certain embodiments, the computing device 1200 can include fewer components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions, the processor 1202 may retrieve (or fetch) the instructions from an internal register, an internal cache, the memory 1204, or the storage device 1206 and decode and execute them. In one or more embodiments, the processor 1202 may include one or more internal caches for data, instructions, or addresses. As an example, and not by way of limitation, the processor 1202 may include one or more instruction caches, one or more data caches, and one or more translation lookaside buffers (TLBs). Instructions in the instruction caches may be copies of instructions in the memory 1204 or the storage device 1206.

The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1204 may be internal or distributed memory.

The storage device 1206 includes storage for storing data or instructions. As an example, and not by way of limitation, storage device 1206 can comprise a non-transitory storage medium described above. The storage device 1206 may include a hard disk drive (HDD), a floppy disk drive, flash memory, an optical disc, a magneto-optical disc, magnetic tape, or a Universal Serial Bus (USB) drive or a combination of two or more of these. The storage device 1206 may include removable or non-removable (or fixed) media, where appropriate. The storage device 1206 may be internal or external to the computing device 1200. In one or more embodiments, the storage device 1206 is non-volatile, solid-state memory. In other embodiments, the storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example, and not by way of limitation, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1210 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1210 may facilitate communications across various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1212 may include hardware, software, or both that couples components of the computing device 1200 to each other. As an example and not by way of limitation, the communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause a computing device to:
    receive a user-defined plausible boundary about a reference instance of a person in a reference image from a plurality of images, wherein the plurality of images comprises a plurality of instances of the person and a target image with a target instance of the person,
    align the target image and the reference image;
    determine a replacement region by modifying the user-defined plausible boundary to generate a boundary that passes through consistent pixels in the target image and the reference image while passing as close as possible to the user-defined plausible boundary; and
    generate an enhanced image by replacing a reference region from the reference image that corresponds with the replacement region with a target region from the target image that corresponds with the replacement region.

2. The non-transitory computer readable medium of claim 1, further comprising instructions that, when executed by the at least one processor, cause the computing device to determine the replacement region using a cut-graph algorithm that identifies the boundary from the user-defined plausible boundary by identifying pixels with a maximum consistency and minimal passage across structured objects in the target and reference images.

3. The non-transitory computer readable medium of claim 2, further comprising instructions that, when executed by the at least one processor, cause the computing device to constrain the cut-graph algorithm to pass as close as possible to the user-defined plausible boundary.

4. The non-transitory computer readable medium of claim 1, further comprising instructions that, when executed by the at least one processor, cause the computing device to:
    generate a plurality of aesthetic ratings for the plurality of instances of the person from the plurality of images; and select an instance of the person with a highest aesthetic rating as the target instance.

5. The non-transitory computer readable medium of claim 1, wherein the instructions, when executed by the at least one processor, cause the computing device to receive the user-defined plausible boundary about the reference instance of the person by receiving one or more touch gestures on a touch screen to select at least a portion of the reference instance of the person.

6. The non-transitory computer readable medium of claim 1, wherein:
the user-defined plausible boundary defines a region surrounding a head of the person in the target image; and
replacing the reference region from the reference image with the target region from the target image comprises replacing the head of the person in the reference image with the head of the person from the target image.

7. The non-transitory computer readable medium of claim 1, wherein:
the user-defined plausible boundary defines a region surrounding a head and torso of the person in the target image; and
replacing the reference region from the reference image with the target region from the target image comprises replacing the head of the person in the reference image with the head and torso of the person from the target image.

8. The non-transitory computer readable medium of claim 1, further comprising instructions that, when executed by the at least one processor, cause the computing device to align the target image and the reference image by:
identifying a first gyroscope data set corresponding to the reference image and a second gyroscope data set corresponding to the target image;
detecting a first set of feature points within the reference image and a second set of feature points within the target image; and
applying an image-alignment model from a pixel-adjusted-gyroscope-alignment model and a feature-based-alignment model to align the target image with the reference image based on the first and second gyroscope data sets and one or both of the first and second sets of feature points.

9. A system operable to mix and match faces in group digital portraits, the system comprising:
a camera;
a touch screen;
a plurality of images captured using the camera, the plurality of images including a plurality of instances of a person; and
at least one processor configured to cause the system to:
receive, via the touch screen, a user-defined plausible boundary about a reference instance of the person in a reference image from the plurality of images;
align a target image and the reference image;
determine a replacement region by modifying the user-defined plausible boundary to generate a boundary that passes through consistent pixels in the target image and the reference image while passing as close as possible to the user-defined plausible boundary; and
generate an enhanced image by replacing a reference region from the reference image that corresponds with the replacement region with a target region from the target image that corresponds with the replacement region.

10. The system of claim 9, wherein the at least one processor is further configured to cause the system to capture the plurality of images using a burst mode of the camera.

11. The system of claim 9, wherein the at least one processor is further configured to cause the system to determine the replacement region using a graph cut algorithm that identifies the boundary from the user-defined plausible boundary by identifying pixels with a maximum consistency and minimal passage across structured objects in the target and reference images while being constrained to have minimum deviation from the user-defined plausible boundary.

12. The system of claim 11, wherein using the graph cut algorithm comprises penalizing potential boundaries going through high frequency regions more than potential boundaries going through low frequency areas.

13. The system of claim 9, wherein the at least one processor is further configured to cause the system to align the target image and the reference image by:
selecting an image-alignment model from a pixel-adjusted-gyroscope-alignment model and a feature-based-alignment model; and
applying the selected image-alignment model to the target image and the reference image to determine an alignment between the target image and the reference image.

14. The system of claim 9, wherein the at least one processor is further configured to cause the system to generate enhanced image by replacing the reference region with pixels form the target region using Gaussian blending.

15. The system of claim 14, wherein using Gaussian blending comprises applying alpha blending on the target region and the reference region.

16. A method of mixing and matching faces in group digital portraits comprising:
receiving a user-defined plausible boundary about a reference instance of a person in a reference image from a plurality of images, wherein the plurality of images comprises a plurality of instances of the person and a target image with a target instance of the person;
aligning the target image and the reference image;
determining a replacement region by modifying the user-defined plausible boundary to generate a boundary that passes through consistent pixels in the target image and the reference image while minimizing deviation from the user-defined plausible boundary; and
generating an enhanced image by replacing a reference region from the reference image that corresponds with the replacement region with a target region from the target image that corresponds with the replacement region.

17. The method of claim 16, further comprising receiving the user-defined plausible boundary about the reference instance of the person by receiving one or more touch gestures on a touch screen to select at least a portion of the reference instance of the person.

18. The method of claim 16, wherein:
the user-defined plausible boundary defines a region surrounding a head of the person in the target image; and
replacing the reference region from the reference image with the target region from the target image comprises replacing the head of the person in the reference image with the head of the person from the target image.

19. The method of claim 16, wherein:
the user-defined plausible boundary defines a region surrounding a head and torso of the person in the target image; and replacing the reference region from the reference image with the target region from the target image comprises replacing the head of the person in the reference image with the head and torso of the person from the target image.

20. The method of claim 19, further comprising:

receiving a second user-defined plausible boundary about a reference instance of a second person in the reference image;

determining a second replacement region based on the second user-defined plausible boundary, which includes the reference instance of the second person and a second target instance of the second person, having a second boundary passing through consistent pixels in the target image and the reference image; and generating an updated enhanced image by replacing a second reference region from the reference image that corresponds with the second replacement region with a second target region from the target image that corresponds with the second replacement region.

\* \* \* \* \*